(12) United States Patent
Sonobe et al.

(10) Patent No.: US 8,795,790 B2
(45) Date of Patent: Aug. 5, 2014

(54) MAGNETIC RECORDING MEDIUM AND MAGNETIC RECORDING MEDIUM MANUFACTURING METHOD

(75) Inventors: Yoshiaki Sonobe, Tokyo (JP); Akira Shimada, Tokyo (JP); Tsuyoshi Ozawa, Tokyo (JP); Masanori Aniya, Tokyo (JP)

(73) Assignee: WD Media (Singapore) Pte. Ltd., Singapore (SG)

( * ) Notice: Subject to any disclaimer, the term of this patent is extended or adjusted under 35 U.S.C. 154(b) by 365 days.

(21) Appl. No.: 13/133,941

(22) PCT Filed: Dec. 9, 2009

(86) PCT No.: PCT/JP2009/070624
§ 371 (c)(1),
(2), (4) Date: Aug. 24, 2011

(87) PCT Pub. No.: WO2010/067830
PCT Pub. Date: Jun. 17, 2010

(65) Prior Publication Data
US 2012/0170152 A1 Jul. 5, 2012

(30) Foreign Application Priority Data

Dec. 9, 2008 (JP) ................................ 2008-313287
Mar. 31, 2009 (JP) ................................ 2009-087765

(51) Int. Cl.
*C23C 14/48* (2006.01)
*C23C 14/58* (2006.01)
*C23C 14/04* (2006.01)
*B05D 5/08* (2006.01)
*B05D 5/02* (2006.01)

(52) U.S. Cl.
USPC ........... 427/526; 427/491; 427/535; 427/536; 427/130; 427/131; 427/534; 427/525; 427/529; 427/528; 427/527; 427/334; 216/12; 216/67; 216/72

(58) Field of Classification Search
None
See application file for complete search history.

(56) References Cited

U.S. PATENT DOCUMENTS 4,689,260 A * 8/1987 Briska et al. .................. 428/161
6,153,281 A * 11/2000 Meyer et al. ............... 428/848.5

(Continued)

FOREIGN PATENT DOCUMENTS

JP  1-279421  11/1989
JP  2-023512   1/1990

(Continued)

OTHER PUBLICATIONS

Machine translation of JP 2009-026435, published Feb. 5, 2009, by Fukushima et al. (G11B 5/855), "method of producing magnetic recording medium, and magnetic recording and reading device".*

(Continued)

*Primary Examiner* — Marianne L Padgett

(57) ABSTRACT

[Problem] An object is to provide a magnetic recording medium with improved HDI characteristics, such as impact resistance, and its manufacturing method.
[Solution] A typical structure of a magnetic recording medium 100 according to the present invention includes, on a base, at least a magnetic recording layer 122, a protective layer 126, and a lubricating layer 128, wherein the magnetic recording layer 122 includes, in an in-plane direction, a magnetic recording part 136 configured of a magnetic material and a non-recording part 134 magnetically separating the magnetic recording part 136, and a surface corresponding to the non-recording part 134 protuberates more than a surface corresponding to the magnetic recording part 136.

5 Claims, 11 Drawing Sheets

(56) References Cited

U.S. PATENT DOCUMENTS

| | | | |
|---|---|---|---|
| 6,753,130 B1 * | 6/2004 | Liu et al. | 430/313 |
| 7,378,028 B2 * | 5/2008 | Wago et al. | 216/22 |
| 7,517,463 B1 * | 4/2009 | Bonhote et al. | 216/22 |
| 8,354,035 B2 * | 1/2013 | Hilkene et al. | 216/22 |
| 2005/0271819 A1 * | 12/2005 | Wago et al. | 427/259 |
| 2008/0075845 A1 * | 3/2008 | Sonobe et al. | 427/130 |
| 2009/0323219 A1 * | 12/2009 | Fukushima et al. | 360/122 |
| 2010/0213163 A1 * | 8/2010 | Watanabe et al. | 216/22 |

FOREIGN PATENT DOCUMENTS

| | | | | |
|---|---|---|---|---|
| JP | 2-165416 | | 6/1990 | |
| JP | 5-258291 | | 10/1993 | |
| JP | 2005-276275 | | 10/2005 | |
| JP | 2007-157311 | | 6/2007 | |
| JP | 2007-226862 | | 9/2007 | |
| JP | 2007-226862 A | * | 9/2007 | G11B 5/84 |
| JP | 2007-273067 | | 10/2007 | |
| JP | 2007-273067 A | * | 10/2007 | G11B 5/84 |
| JP | 2008-052860 | | 3/2008 | |
| JP | 2008-052860 A | * | 3/2008 | G11B 5/84 |
| JP | 2008-077756 A | * | 4/2008 | G11B 5/84 |
| WO | WO 2008/035644 A1 | * | 3/2008 | G11B 5/855 |

OTHER PUBLICATIONS

Robert C Weast, PhD, editor; CRC Handbook of Chemistry and Physics, 56th edition; CRC press, Cleveland, OH 44128; 1975 (no month); excerpts pp. B-127, B-142, D-135, D-218 to D220, D-244, D-256 & F-109.*

International Search Report dated Mar. 2, 2010 for Patent Application No. PCT/JP2009-070499, 7 pages.

* cited by examiner

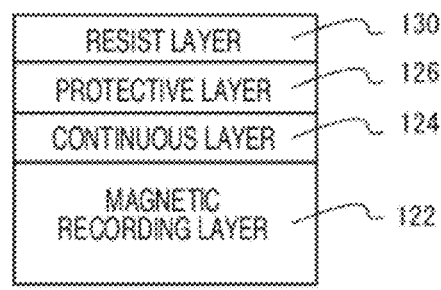
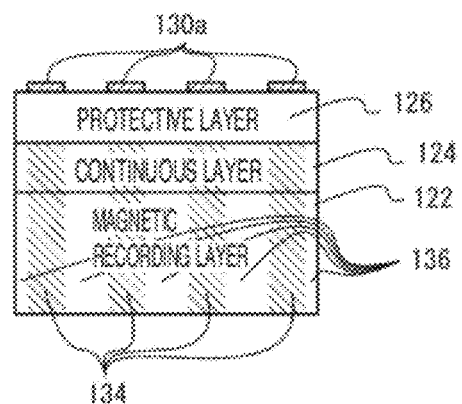
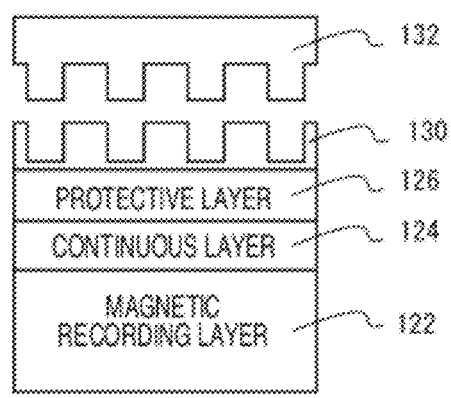
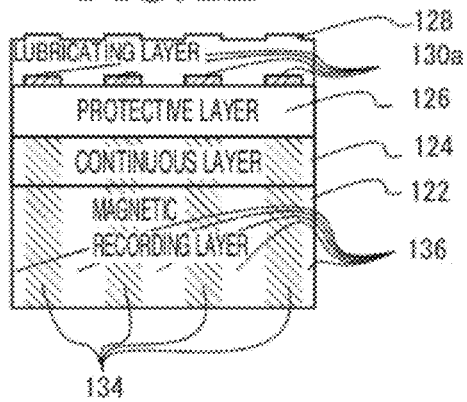
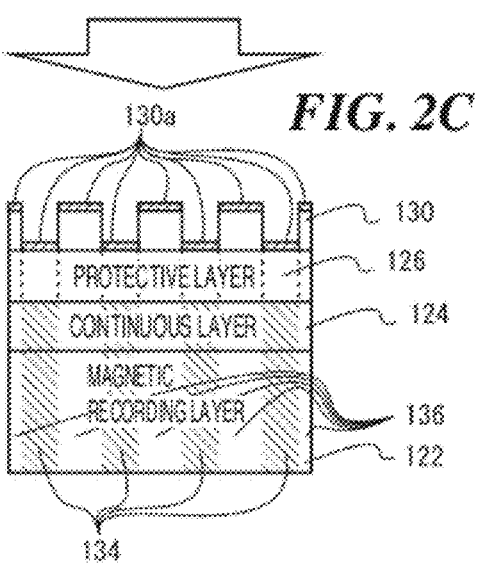

FIG. 4

| EMBODIMENT 1 | PEELING-OFF METHOD | ION IMPLANTATION | | | HEIGHT OF PROTUBERANCE (nm) | PRESENCE/ABSENCE OF MAGNETIC SEPARATION (MM) | PRESENCE/ABSENCE OF HEAD FLOATING BEFORE IMPACT TEST | PRESENCE/ABSENCE OF HEAD FLOATING AFTER IMPACT TEST |
|---|---|---|---|---|---|---|---|---|
| | | DOSE AMOUNT atom/cm² | ENERGY (keV) | IMPLANTED IONS | | | | |
| COMPARATIVE EXAMPLE 1-1 | KOH IMMERSION | 1E+14 | 0.5 | N₂ | 0.0 | NG | – | – |
| COMPARATIVE EXAMPLE 1-2 | | 1E+15 | 0.5 | | 0.0 | NG | – | – |
| COMPARATIVE EXAMPLE 1-3 | | 1E+16 | 0.5 | | 0.2 | NG | – | – |
| COMPARATIVE EXAMPLE 1-4 | | 1E+17 | 0.5 | | 0.5 | NG | – | – |
| COMPARATIVE EXAMPLE 1-5 | | 1E+18 | 0.5 | | 1.1 | NG | – | – |
| COMPARATIVE EXAMPLE 1-6 | | 1E+14 | 5.0 | | 0.6 | NG | – | – |
| EXAMPLE 1-1 | | 1E+15 | 5.0 | | 1.1 | OK | OK | OK |
| EXAMPLE 1-2 | | 1E+16 | 5.0 | | 1.7 | OK | OK | OK |
| EXAMPLE 1-3 | | 1E+17 | 5.0 | | 2.4 | OK | OK | OK |
| COMPARATIVE EXAMPLE 1-7 | | 1E+18 | 5.0 | | 3.3 | NG | – | – |
| EXAMPLE 1-4 | | 1E+14 | 20.0 | | 1.2 | OK | OK | OK |
| EXAMPLE 1-5 | | 1E+15 | 20.0 | | 2.0 | OK | OK | OK |
| EXAMPLE 1-6 | | 1E+16 | 20.0 | | 3.4 | OK | OK | OK |
| EXAMPLE 1-7 | | 1E+17 | 20.0 | | 4.0 | OK | OK | OK |
| COMPARATIVE EXAMPLE 1-8 | | 1E+18 | 20.0 | | 5.1 | NG | – | – |
| EXAMPLE 1-8 | | 1E+14 | 50.0 | | 2.2 | OK | OK | OK |
| EXAMPLE 1-9 | | 1E+15 | 50.0 | | 3.9 | OK | OK | OK |
| EXAMPLE 1-10 | | 1E+16 | 50.0 | | 5.5 | OK | NG | OK |
| COMPARATIVE EXAMPLE 1-11 | | 1E+17 | 50.0 | | 7.0 | OK | NG | OK |
| COMPARATIVE EXAMPLE 1-12 | | 1E+18 | 50.0 | | 8.8 | NG | – | – |
| COMPARATIVE EXAMPLE 1-9 | ASHING | 1E+16 | 20.0 | | 3.8 | OK | OK | OK |
| COMPARATIVE EXAMPLE 1-10 | | 2E+16 | 20.0 | | 4.0 | OK | OK | OK |
| COMPARATIVE EXAMPLE 1-13 | KOH IMMERSION | 1E+16 | 20.0 | | 0.0 | OK | OK | NG |

FIG. 6

| EMBODIMENT 2 | PEELING-OFF METHOD | ION IMPLANTATION | | | DIFFERENCE IN THICKNESS OF LUBRICATING LAYER (nm) | PRESENCE/ABSENCE OF MAGNETIC SEPARATION (MR) | PRESENCE/ABSENCE OF HEAD FLOATING BEFORE IMPACT TEST | PRESENCE/ABSENCE OF HEAD FLOATING AFTER IMPACT TEST |
|---|---|---|---|---|---|---|---|---|
| | | DOSE AMOUNT atom/cm2 | ENERGY (keV) | IMPLANTED IONS | | | | |
| COMPARATIVE EXAMPLE 2-1 | KOH IMMERSION | 1E+14 | 20.0 | N2 | 0.1 | NG | NG | – |
| EXAMPLE 2-1 | | 1E+15 | | | 0.2 | OK | OK | OK |
| EXAMPLE 2-2 | | 1E+16 | | | 0.3 | OK | OK | OK |
| EXAMPLE 2-3 | | 1E+17 | | | 0.4 | OK | OK | OK |
| COMPARATIVE EXAMPLE 2-2 | | 1E+18 | | | 0.6 | NG | NG | – |
| COMPARATIVE EXAMPLE 2-3 | | 1E+16 | 20.0 | Ar | 0.0 | OK | OK | NG |

FIG. 8

| | PEELING-OFF METHOD | ON IMPLANTATION | | | HEIGHT OF PROTUBERANCE (nm) | PRESENCE/ABSENCE OF MAGNETIC SEPARATION (dpm) | PRESENCE/ABSENCE OF HEAD FLOATING BEFORE IMPACT TEST | PRESENCE/ABSENCE OF HEAD FLOATING AFTER IMPACT TEST |
|---|---|---|---|---|---|---|---|---|
| EMBODIMENT 2 | | DOSE AMOUNT atom/cm2 | ENERGY [keV] | IMPLANTED IONS | | | | |
| COMPARATIVE EXAMPLE 3-1 | KOH IMMERSION | 1E+14 | 20.0 | Xe | 0.4 | NG | - | - |
| EXAMPLE 3-1 | | 1E+15 | | | 1.1 | OK | OK | OK |
| EXAMPLE 3-2 | | 1E+16 | | | 1.5 | OK | OK | OK |
| EXAMPLE 3-3 | | 1E+17 | | | 2.1 | OK | OK | OK |
| COMPARATIVE EXAMPLE 3-2 | | 1E+18 | | | 2.8 | NG | - | - |

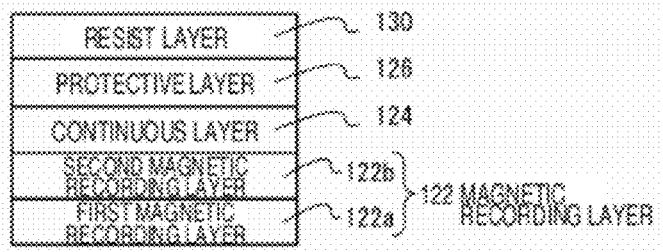
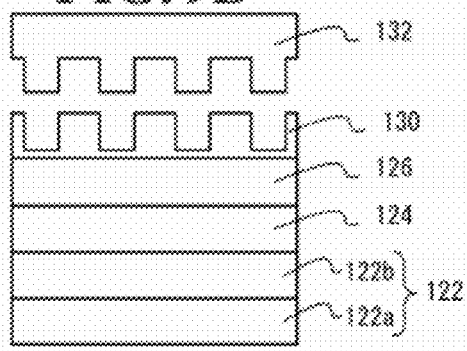
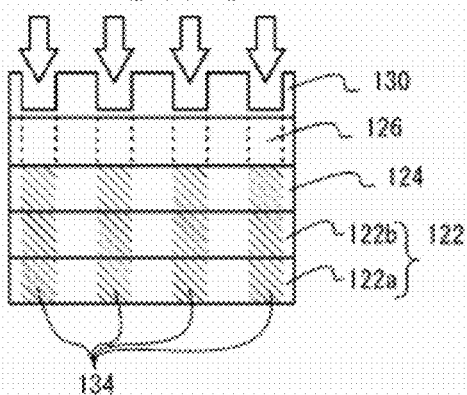
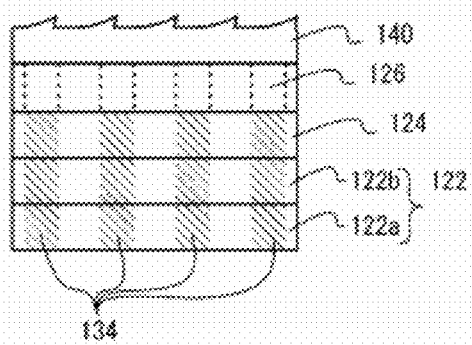
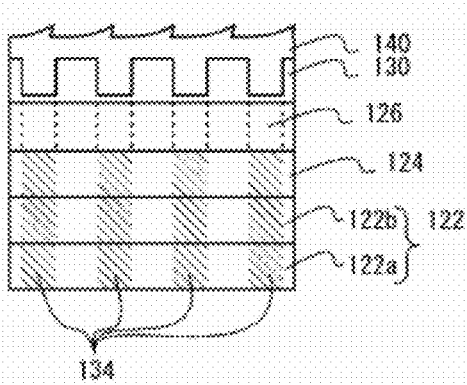
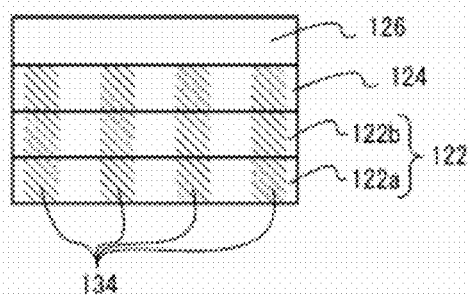

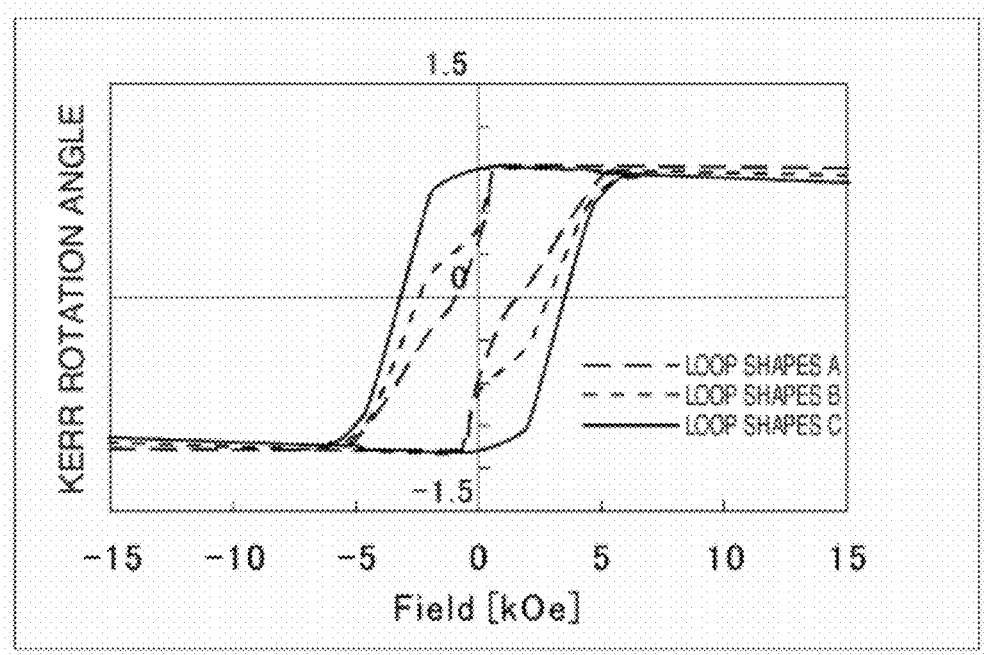

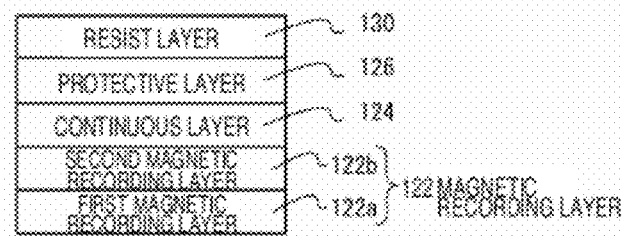
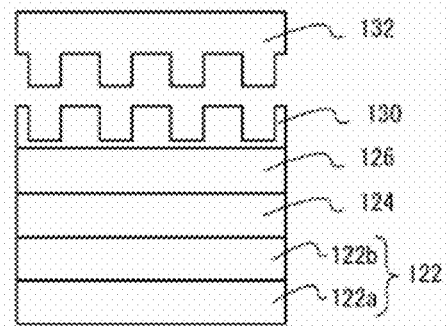
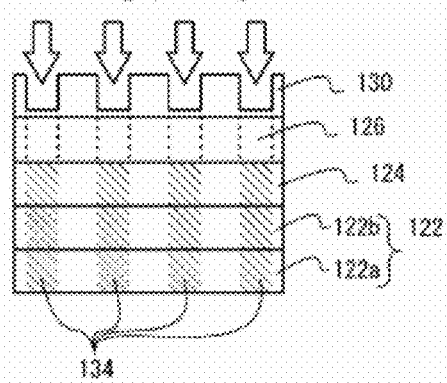
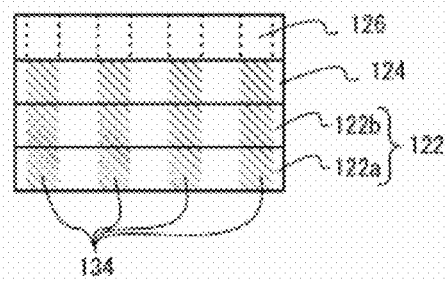
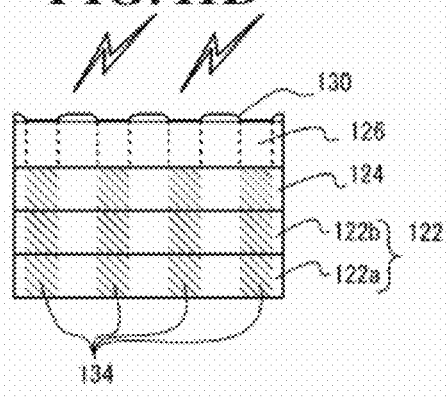
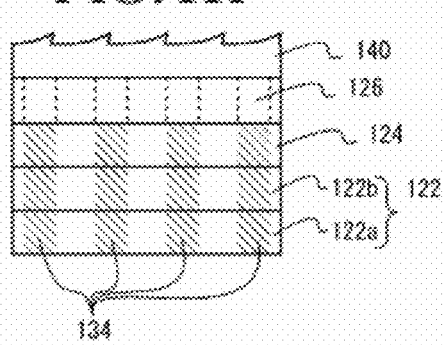

MAGNETIC RECORDING MEDIUM AND MAGNETIC RECORDING MEDIUM MANUFACTURING METHOD

TECHNICAL FIELD

The present invention relates to magnetic recording medium and a method of manufacturing a perpendicular magnetic recording medium.

BACKGROUND ART

With an increase in capacity of information processing in recent years, various information recording technologies have been developed. In particular, the surface recording density of an HDD using magnetic recording technology is continuously increasing at an annual rate of approximately 100%. In recent years, an information recording capacity exceeding 200 gigabytes/platter with a 2.5-inch diameter of a magnetic disk for use in an HDD or the like has been desired. To fulfill such demands, an information recording density exceeding 400 gigabits/inch square is desired to be achieved.

To achieve high recording density in a magnetic disk for use in an HDD or the like, a magnetic disk of a perpendicular magnetic recording type (a perpendicular magnetic recording disk) has been suggested in recent years. In an in-plane magnetic recording type, an easy axis of magnetization of a magnetic recording layer is oriented in a plane direction of a base surface. In the perpendicular magnetic recording type, the easy axis of magnetization is adjusted so as to be oriented in a perpendicular direction with respect to the base surface. Compared with the in-plane magnetic recording type, the perpendicular magnetic recording type can suppress a thermal fluctuation phenomenon more, and therefore is suitable for increasing recording density.

Furthermore, as technologies that improve recording density and resistance to thermal fluctuation, suggested are magnetic recording media, including a discrete track medium preventing interference of an adjacent recording track by patterning a non-magnetic track in parallel between magnetic tracks for recording, and a medium called a bit pattern medium with arbitrary patterns artificially regularly arranged.

For the magnetic recording medium, such as the discrete track medium and the bit pattern medium described above, suggested are a technology of forming a magnetically-separated magnetic pattern by, after forming a magnetic recording layer on a non-magnetic base, partially implanting ions for non-magnetization or amorphousness (Patent Document 1) and a technology of forming a magnetic pattern by, after forming a magnetic recording layer on a non-magnetic base, partially milling the magnetic recording layer to form asperities and physically separating the magnetic recording layer (for example, Patent Document 2).

Specifically, first, a resist film is formed on a magnetic recording layer, and a stamper having a desired asperity pattern formed thereon is imprinted on the resist to transfer the asperity pattern. Alternatively, a photoresist film is formed on a magnetic recording layer, and a desired asperity pattern is formed on the photoresist by photolithography. Then, ions are implanted in the magnetic recording layer via the formed recessed part, or the magnetic recording layer exposed on the surface of the recessed part is milled by etching, thereby separating the magnetic recording layer.

On the other hand, with an increase in density in the magnetic recording technology, a magnetic head is being changed from a thin-film head to a magneto-resistive head (an MR head) and a giant magneto-resistive head (a GMR head). The floating amount from the base of the magnetic head is narrowed to approximately 5 nm.

With a low floating amount of the magnetic head, the magnetic head may collide with a magnetic disk when use to damage the surface of the magnetic disk. Therefore, the magnetic head is desired to have a high floating stability.

For example, Patent Document 3 discloses a discrete track medium with a magnetic recording part divided at a non-recording part. Also disclosed therein is a structure in which a surface of the magnetic recording part is formed as being convex and a surface of the non-recording part is formed as being concave. According to Patent Document 3, a stable floating characteristic can be obtained.

PRIOR ART DOCUMENT

Patent Document 1: Japanese Unexamined Patent Application Publication No. 2007-226862; Patent Document 2: Japanese Unexamined Patent Application Publication No. 2007-157311; Patent Document 3: Japanese Unexamined Patent Application Publication No. 2005-276275

DISCLOSURE OF INVENTION

Problems to be Solved by the Invention

However, no matter how floating stability of the head is increased, the head may collide when, for example, the head seek direction is changed. In Patent Document 3 mentioned above, in the magnetic recording layer, the magnetic recording part protuberates more than the non-recording part. Therefore, the magnetic head tends to collide with the magnetic recording part protuberating more compared with the non-recording part. The magnetic recording part is a region where information is to be recorded and, if the magnetic head collides with the magnetic recording part, the magnetic recording part is damaged to become unable to be read or written, thereby decreasing durability of the magnetic disk.

To get around this, it is desired to provide a magnetic recording medium with improved HDI (Head Disk Interface) characteristics, such as impact resistance, and its manufacturing method. Note that HDI characteristics are those based on a relation between the head and the surface of the magnetic disk.

Also, in the patterned medium manufacturing method described above, when asperities are formed on the magnetic recording layer by milling, a film of a filling layer is required to be formed so as to bury the formed recessed part. At this time, when the film of the filling layer is formed by sputtering, the film of the filling layer is formed in the recessed part, and a coating film (the filling layer) is also naturally formed on the projected part. Therefore, on a main surface of the magnetic recording medium, a projected part with this coat is formed. To get around this, to remove the coat film formed on the protruded part, the coat film formed on the recessed part is cut away by etching, and the main surface is required to be planarized.

Because of the reasons described above, in comparison between the manufacturing method by ion implantation as in Patent Document 1 and the manufacturing method by etching to mill the magnetic recording layer as in Patent Document 2, the patterned medium can be far easily manufactured in the manufacturing method by ion implantation.

However, the manufacturing method by ion implantation has a problem that non-magnetization of the non-recording part formed by this method tends to be insufficient. In detail, in the manufacturing method by ion implantation, ions are implanted in the magnetic recording layer by using an ion beam method to change an ion-implanted portion of the crystalline magnetic recording layer to be amorphous and non-magnetic. Therefore, with a shortage of the amount (dose) of implantation of ions, a portion of the magnetic recording layer as a non-recording part is not sufficiently changed to be amorphous, complete non-magnetization of that portion cannot be achieved, and the non-recording part becomes magnetic. As a result, magnetism of the non-recording part causes noise at the time of reading with the magnetic head, inviting a decrease in read/write characteristics.

Here, to make the non-recording part completely non-magnetic, the amount of implantation of ions may be increased. However, if the amount of implantation of ions is increased too much, that causes the part to be changed to be amorphous too much, and not only the portion of the magnetic recording layer as a non-recording part but also a portion as a magnetic track is changed to be amorphous (non-magnetic). As a result, a decrease in overwrite characteristics is invited.

Therefore, under present circumstances, the amount of implantation of ions has to be limited to some extent. When the manufacturing method by ion implantation is used, a slight decrease in read/write characteristics has to be allowed. For this reason, it is desired to develop a scheme capable of reliably changing the non-recording part non-magnetic without depending on the amount of implantation of ions.

Thus, it is desired to provide a method of manufacturing a magnetic recording medium, the method capable of, even when ion implantation is used to form a magnetic pattern including a magnetic recording part and a non-recording part, reliably changing the non-recording part to be non-magnetic and improving the quality of the magnetic recording medium.

To solve the problems described above, a typical structure of a magnetic recording medium according to the present invention includes, on a base, at least a magnetic recording layer, a protective layer, and a lubricating layer, wherein the magnetic recording layer includes, in an in-plane direction, a magnetic recording part configured of a magnetic material and a non-recording part magnetically separating the magnetic recording part, and a surface corresponding to the non-recording part protuberates more than a surface corresponding to the magnetic recording part.

With this structure, a distance from the magnetic head is closer to the non-recording part than the magnetic recording part. For this reason, the magnetic head floating over the magnetic recording medium makes contact with the surface of the non-recording part earlier at the time of a head seek, and thus a contact on the surface of the magnetic recording part is more prone to be avoided, thereby significantly improving HDI characteristics, such as impact resistance. Note that the resist layer is preferably removed by being immersed in an alkaline solution.

The non-recording part may preferably have a relative permeability μ of 2 to 100. By optimizing the relative permeability of the non-recording part magnetically separating the magnetic recording part in the magnetic recording layer, a characteristic of writing in the magnetic recording part can be improved.

A residue of a resist agent may preferably be present on the non-recording part, and a residue of the resist agent on the magnetic recording part may preferably be less than the residue on the non-recording part or none. In other words, the resist agent may preferably be present on the non-recording part, and the resist agent on the magnetic recording part may preferably be less than that on the non-recording part or none. With the resist agent being present on the non-recording part more than the resist agent left on the magnetic recording part, the surface of the non-recording part protuberates accordingly.

To solve the problems described above, a typical structure of a magnetic recording medium manufacturing method according to the present invention includes the steps of: forming a film of a magnetic recording layer; forming a film of a resist layer; forming a predetermined asperity pattern on the resist layer; implanting ions with a residue present in a recessed part of the resist layer after the pattern is formed; removing a projected part of the resist so that the residue is left. In other words, the resist layer is removed so that the resist agent on the non-recording part is left more than the resist agent on the magnetic recording part.

When ions are implanted in the resist layer, a portion corresponding to a surface layer of the resist layer is altered (burnt) and adhered to the surroundings. When a predetermined asperity pattern is formed after the resist layer film formation, the thickness of the recessed part is significantly thinner than that of the projected part. When ions are implanted with the resist layer having a sufficient thickness, only the surface layer of the resist layer is changed. However, in the recessed part, immediately below the residue of the resist is the non-recording part, and thus the resist residue (altered resist layer) is adhered to the non-recording part. However, in a portion other than the surface layer of the resist layer, the state in which the resist layer is formed can be kept after ion implantation, and therefore the resist layer can be cleanly removed.

Another typical structure of the magnetic recording medium manufacturing method according to the present invention may preferably include the steps of: forming a film of a magnetic recording layer; forming a film of a carbon protective layer above the magnetic recording layer; forming a film of a resist layer above the carbon protective layer; forming a predetermined asperity pattern on the resist layer; implanting N ions from above the resist layer; removing the resist layer; and forming a film of a lubricating layer made of perfluoropolyether (PFPE) on the carbon protective layer.

By using N ions as those forming the non-recording part, a large amount of N ions (nitrogen ions) are contained at a position corresponding to the non-recording part of the carbon protective layer (COC: carbon overcoat). Since PFPE molecules configuring a lubricating layer are bonded to N ions, with an increase of N ions on the surface of the non-recording part, the amount of attachment of PFPE is increased on the surface of the non-recording part than the surface of the magnetic recording part, and therefore the lubricating layer on the non-recording part becomes thick. Therefore, the non-recording part can protuberate more than the magnetic recording part, thereby protecting the magnetic recording part.

To solve the problems described above, a typical structure of a magnetic recording medium manufacturing method according to the present invention includes, on a base, at least a magnetic recording layer having a magnetic recording part and a non-recording part in an in-plane direction, the method includes: a resist layer forming step of forming a film of a resist layer on the magnetic recording layer; a patterning step of processing the resist layer to partially change a thickness of the resist layer and form a projected part and a recessed part of a predetermined pattern; an ion implanting step of implanting ions from the recessed part in the magnetic recording layer with interposition of the resist layer; and a resist layer removing step of removing the resist layer, wherein in the resist layer removing step, the resist layer is removed by being immersed in an alkaline solution, and immersion in the alkaline solution continues even after the removal of the resist layer to promote non-magnetization of the non-recording part.

According to the structure above, with the alkaline solution for use in removing the resist layer in the resist layer removing step, not only removal of the resist layer but also non-magnetization of the non-recording part can be promoted. With this, even when non-magnetization of the non-recording part is not sufficient in the ion implanting step, non-magnetization of the non-recording part can be reliably performed in the resist layer removing step. Therefore, also when the ion implantation is used for forming a magnetic pattern formed of a magnetic recording part and a non-recording part, a decrease in read/write characteristics due to magnetism of the non-recording part can be prevented, thereby improving quality of the magnetic recording medium. Furthermore, by using ion implantation for forming a magnetic pattern, a patterned medium can be more easily manufactured than the case of using milling, thereby improving manufacturing efficiency of the magnetic recording medium.

Note that although a mechanism in which non-magnetization of the non-recording part is promoted with an alkaline solution is not certain, it can be thought that, when the magnetic recording layer is impregnated with an alkaline solution, metal configuring magnetic particles of the magnetic recording layer is dissolved into the alkaline solution, thereby promoting the magnetic particles to become finer and causing the size of the magnetic particles to become extremely small, and thus the magnetic particles become paramagnetic substances.

To solve the problems described above, another structure of the magnetic recording medium manufacturing method according to the present invention includes, on a base, at least a magnetic recording layer having a magnetic recording part and a non-recording part in an in-plane direction, the method includes: a resist layer forming step of forming a film of a resist layer on the magnetic recording layer; a patterning step of processing the resist layer to partially change a thickness of the resist layer and form a projected part and a recessed part of a predetermined pattern; an ion implanting step of implanting ions from the recessed part in the magnetic recording layer with interposition of the resist layer; a resist layer removing step of removing the resist layer by RIE; and a non-magnetization promoting step of promoting non-magnetization of the non-recording part by immersion in an alkaline solution after the resist layer is removed.

Also in this structure, non-magnetization of the non-recording part can be promoted by using an alkaline solution, thereby obtaining an advantage similar to that described above. And, in the structure described above, before immersion in the alkaline solution, the resist layer is removed in advance by RIE (Reactive Ion Etching), thereby reducing an immersion time. Therefore, the time of manufacturing the magnetic recording medium can be reduced, thereby improving manufacturing efficiency.

The alkaline solution may preferably be a KOH solution with pH9 or higher. Since KOH is a strong base, the KOH solution shows strong alkalescence. Therefore, by using the KOH solution as an alkaline solution, the non-recording part can be most effectively non-magnetized.

The KOH solution may preferably have a concentration equal to or higher than 10 wt %. With this, the non-recording part can be reliably non-magnetized.

The immersion in the alkaline solution may preferably take four hours or more. With this structure, a portion as the non-recording part in the magnetic recording layer can be reliably impregnated with the alkaline solution.

The magnetic recording medium manufacturing method may preferably further include a protective layer forming step of forming a film of a protective layer made of a C-based material on the magnetic recording layer by CVD, wherein in the resist layer forming step, the film of the resist layer is formed on the protective layer.

According to the structure described above, since the protective layer is interposed between the magnetic recording layer and the resist layer, the alkaline solution in which the resist layer is immersed does not make direct contact with the magnetic recording layer. Therefore, impregnation of a portion as the magnetic recording part in the magnetic recording layer with the alkaline solution can be prevented, thereby preventing non-magnetization of that portion.

Note that the protective layer does not inhibit impregnation of the portion as the non-recording part in the magnetic recording layer with the alkaline solution. The reason for this is described in detail below. When the film of the protective layer is formed on the magnetic recording layer, ions are implanted via the resist layer and the protective layer in the magnetic recording layer in the ion implanting step described above. Therefore, the protective layer (coat) through which ions have passed is in a coarse state, the coarse protective layer is impregnated with the alkaline solution, and then the alkaline solution eventually reaches the magnetic recording layer.

According to the magnetic recording medium and magnetic recording medium manufacturing method of the present invention, with an upper portion of the non-recording part protuberating more than that of the magnetic recording part, the possibility of collision between the magnetic head and the magnetic recording part can be reduced, durability can be improved, and HDI characteristics, such as impact resistance, can be more improved.

BRIEF DESCRIPTION OF DRAWINGS

FIG. 2A-2E A diagram for describing a pattern forming process.

FIG. 4 A diagram describing examples and comparative examples in a first embodiment.

FIG. 6 A diagram describing examples and comparative examples in a second embodiment.

FIG. 8 A diagram describing examples and comparative examples in a third embodiment.

FIG. 9A-9F A diagram for describing a pattern forming process in a fourth embodiment.

FIG. 10A-10B A diagram showing a hysteresis loop with respect to processing time of an alkaline solution.

FIG. 11A-11F A diagram for describing a pattern forming process in a fifth embodiment.

DESCRIPTION OF REFERENCE NUMERALS

Figure 1:
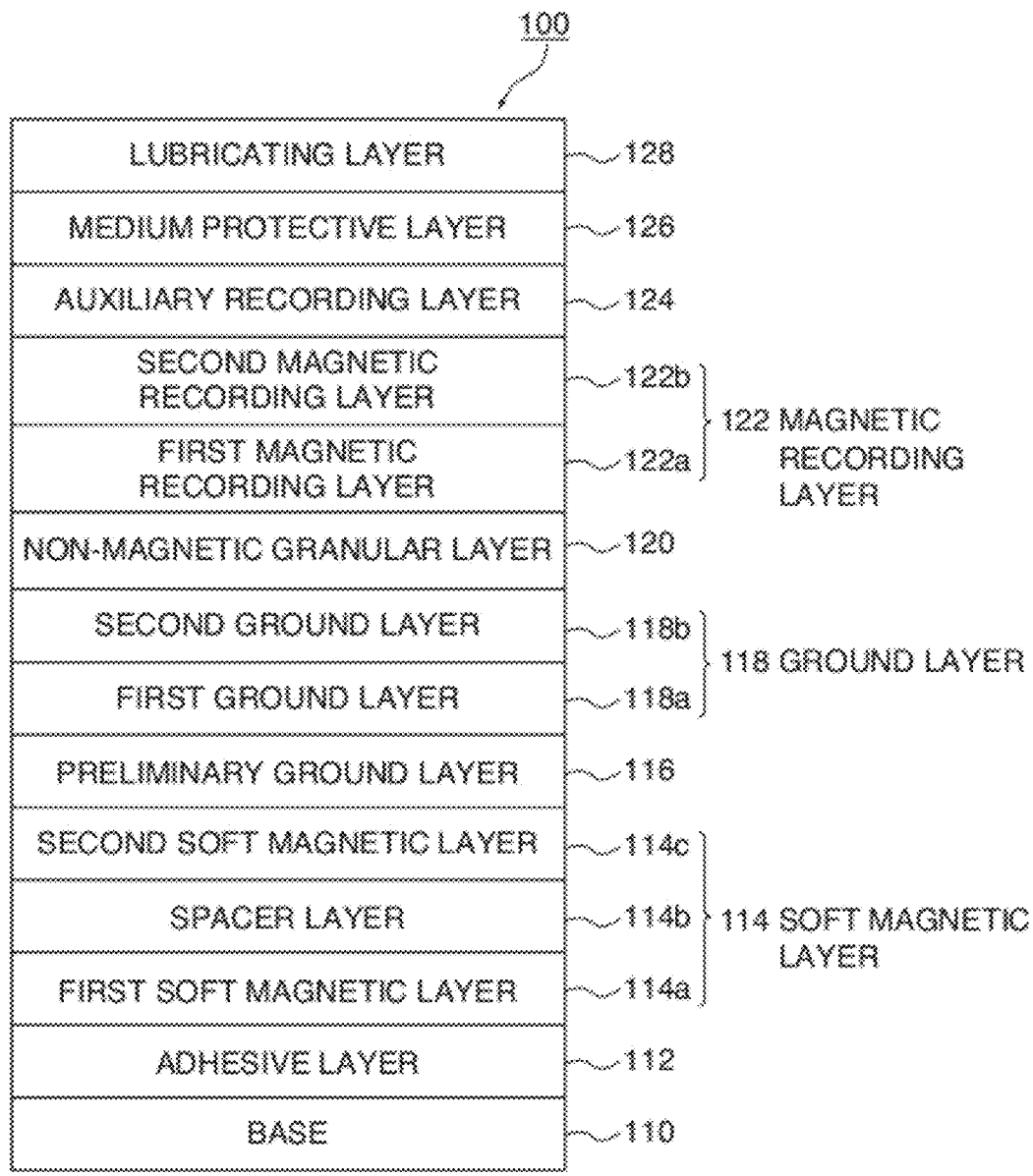
FIG. 1 A drawing for describing the structure of a magnetic recording medium.

100 . . . perpendicular magnetic recording medium
110 . . . substrate
112 . . . adhesion layer
114 . . . soft magnetic layer 114a ... first soft magnetic layer
114b ... spacer layer
114c ... second soft magnetic layer
116 ... preliminary ground layer
118 ... ground layer
118a ... first ground layer
118b ... second ground layer
120 ... non-magnetic granular layer
122 ... magnetic recording layer
124 ... auxiliary recording layer
126 ... protective layer
126a ... protective layer on the non-recording part
126b ... part protuberates on protective layer
128 ... lubricating layer
130 ... resist layer
130a ... altered resist layer
132 ... stamper
134 ... non-recording part
136 ... magnetic recording part
140 ... alkaline solution

BEST MODES FOR CARRYING OUT THE INVENTION

In the following, with reference to the attached drawings, preferred embodiments of the present invention are described in detail. The dimensions, materials, and others such as specific numerical values shown in these embodiments are merely examples so as to facilitate understanding of the invention, and are not meant to restrict the present invention unless otherwise specified. Note that, in the specification and drawings, components having substantially the same functions and structures are provided with the same reference characters and are not redundantly described, and components not directly relating to the present invention are not shown in the drawings.

First Embodiment

FIG. 1 is a diagram for describing the structure of a discrete-type perpendicular magnetic recording medium 100 (hereinafter simply referred to as a magnetic recording medium 100) as a magnetic recording medium according to the present embodiment. The perpendicular magnetic disk 100 depicted in FIG. 1 is configured of a base 110, an adhesion layer 112, a first soft magnetic layer 114a, a spacer layer 114b, a second soft magnetic layer 114c, a preliminary ground layer 116, a first ground layer 118a, a second ground layer 118b, a non-magnetic granular layer 120, a first magnetic recording layer 122a, a second magnetic recording layer 122b, an auxiliary recording layer 124, a protective layer 126, and a lubricating layer 200. Note that the first soft magnetic layer 114a, the spacer layer 114b, and the second soft magnetic layer 114c together form a soft magnetic layer 114. The first ground layer 118a and the second ground layer 118b together form a ground layer 118. The first magnetic recording layer 122a and the second magnetic recording layer 122b together form a magnetic recording layer 122.

As will be described below, in the magnetic recording medium 100 depicted in the present embodiment, with a plurality of oxides (hereinafter referred to as "composite oxides") contained, segregation of the composite oxides is caused at a non-magnetic grain boundary.

Base Molding Process

For the base 110, a glass disk molded in a disk shape by direct-pressing amorphous aluminosilicate glass can be used. Note that the type, size, thickness, and others of the glass disk are not particularly restricted. A material of the glass disk can be, for example, aluminosilicate glass, soda lime glass, soda alumino silicate glass, aluminoborosilicate glass, borosilicate glass, quartz glass, chain silicate glass, or glass ceramic, such as crystallized glass. This glass disk is sequentially subjected to grinding, polishing, and chemical strengthening, thereby allowing the smooth, non-magnetic base 110 made of chemically-strengthened glass disk to be obtained.

Film Forming Process

On the base 110 obtained in the base forming process, sequentially formed by DC (Direct Current) magnetron sputtering are the adhesion layer 112, the soft magnetic layer 114, the preliminary ground layer 116, the ground layer 118, the non-magnetic granular layer 120, the magnetic recording layer 122 (a magnetic recording layer film forming process), and the auxiliary recording layer 124 (an auxiliary recording layer film forming process), and the protective layer 126 (a protective layer film forming process) can be formed by CVD. Note that, in view of high productivity, an in-line-type film forming method may be also preferable. In the following, the structure of each layer and a pattern forming process, which is a feature of the present embodiment, including a resist layer film forming process, a patterning process, an ion implanting process, and a removing process are described.

The adhesive layer 112 is amorphous, is formed adjacent to the base 110, and has a function of increasing an adhesive strength between a soft magnetic layer 114 and a base 110 formed thereon. When the base 110 is formed of amorphous glass, the adhesive layer 112 is preferably an amorphous alloy film so as to correspond to the amorphous glass surface. As the adhesive layer 112, for example, CrTi-type amorphous layer can be selected.

The soft magnetic layer 114 is a layer on which a magnetic path is temporarily formed at the time of recording so as to allow a magnetic flux in a perpendicular direction with respect to the magnetic recording layer 122 in the perpendicular magnetic recording type. The soft magnetic layer 114 can be configured so as to include AFC (Antiferro-magnetic exchange coupling) by interposing a non-magnetic spacer layer 114b between the first soft magnetic layer 114a and the second soft magnetic layer 114c. With this, a magnetizing direction of the soft magnetic layer 114 can be properly aligned with high accuracy along the magnetic path (magnetic circuit), and vertical components in the magnetizing direction become extremely less, thereby reducing noise occurring from the soft magnetic layer 114. As the composition of the first soft magnetic layer 114a and the second soft magnetic layer 114c, a cobalt-type alloy such as CoTaZr, a Co—Fe-type alloy such as CoCrFeB or FeCoTaZr, Ni—Fe-type alloy such as a [Ni—Fe/Sn]n multilayer structure, or others can be used.

The preliminary ground layer 116 is a non-magnetic alloy layer, and includes an operation of protecting the soft magnetic layer 114 and a function of orienting, in a disk perpendicular direction, an easy axis of magnetization of a hexagonal close-packed structure (hcp structure) included in the ground layer 118 formed on the preliminary ground layer. In the preliminary ground layer 116, a (111) surface of an face-centered cubic structure (fcc structure) is preferably parallel to a main surface of the base 110. As a material of the preliminary ground layer, any can be selected from Ni, Cu, Pt, Pd, Zr, Hf, and Nb. Furthermore, an alloy with any of these metals being as a main component and any one or more additional elements of Ti, V, Ta, Cr, Mo, and W being contained may be used. As an fcc structure, for example, NiW, CuW, or CuCr can be suitably selected.

The ground layer 118 is in an hcp structure, and has an operation of growing a Co crystal in an hcp structure of the magnetic recording layer 122 as a granular structure. Therefore, as the crystal orientation of the ground layer 118 is higher, that is, a (0001) surface of the crystal of the ground layer 118 is more parallel to the main surface of the base 110, the orientation of the magnetic recording layer 122 can be improved. As a material of the ground layer 118, Ru is typical. Other than that, a selection can be made from RuCr and RuCo. Since Ru has an hcp structure and a lattice space of the crystal is similar to that of Co, the magnetic recording layer 122 with Co as a main component can be oriented in a good condition When the ground layer 118 is made of Ru, by changing a gas pressure at the time of sputtering, a two-layer structure made of Ru can be made. Specifically, when the second ground layer 118b on an upper layer side is formed, the gas pressure of Ar is made higher than that when the first ground layer 118a on a lower layer side is formed. When the gas pressure is increased, a free moving distance (a mean free path) of Ru ions to be sputtered is shortened, and therefore the film forming speed is delayed, thereby improving crystal separability. Also, with an increased pressure, the size of the crystal lattice is decreased. Since the size of the crystal lattice of Ru is larger than that of the crystal lattice of Co, as the crystal lattice of Ru is smaller, it becomes closer to that of Co, thereby further improving crystal orientation of the granular layer of Co.

The non-magnetic granular layer 120 is a non-magnetic granular layer. A non-magnetic granular layer is formed on the hcp crystal structure of the ground layer 118, and a granular layer of the first magnetic recording layer 122a is grown thereon thereby achieving an operation of separating the magnetic granular layer from a stage of initial growth (startup). The composition of the non-magnetic granular layer 120 can be a columnar granular structure obtained by forming a grain boundary between non-magnetic crystal particles made of a Co-type alloy with segregation of a non-magnetic substance. In particular, CoCr—$SiO_2$ and CoCrRu—$SiO_2$ can be suitably used. Furthermore, in place of Ru, Rh (rhodium), Pd (palladium), Ag (silver), Os (osmium), Ir (iridium), of Au (gold) can also be used. Still further, a non-magnetic substance is a substance in which a grain boundary part can be formed around magnetic particles so as to suppress or interrupt an operation of exchange interaction between magnetic particles (magnetic grains), and may be any non-magnetic substance as long as it is not solid-soluble with cobalt (Co). Examples can include nitric oxide (SiOx), chrome (Cr), chromic oxide ($CrO_2$), titanium oxide ($TiO_2$), zircon oxide ($ZrO_2$), and tantalum oxide ($Ta_2O_5$).

The magnetic recording layer 122 is a ferromagnetic layer having a columnar granular structure having a grain boundary formed therein by subjecting a non-magnetic substance to segregation around the magnetic particles of a soft magnetic substance selected from a Co-type alloy, a Fe-type alloy, and a Ni-type alloy. With provision of the non-magnetic granular layer 120, these magnetic particles can epitaxially grow continued from the granular structure. In the present embodiment, the magnetic recording layer is configured of the first magnetic recording layer 122a and the second magnetic recording layer 122b having different compositions and film thicknesses. For both of the first magnetic recording layer 122a and the second magnetic recording layer 122b, as a non-magnetic substance, an oxide such as $SiO_2$, $Cr_2O_3$, $TiO_2$, $Co_3O_4$, $B_2O_3$, or $Fe_2O_3$, a nitride such as BN, or a carbide such as $B_4C_3$ can be suitably used. Also, a plurality of non-magnetic substances may be added in a combined manner.

Also, the first magnetic recording layer 122a and the second magnetic recording layer 122b forming the magnetic recording layer 122 is subjected to the pattern forming process, which will be described further below, thereby forming a magnetic recording part and a non-recording part with a predetermined pattern. With this, the perpendicular magnetic recording medium 100 can be made as a patterned medium, resistance to thermal fluctuation can be improved, and an increase in recording density can be promoted. As this patterned medium, the perpendicular magnetic recording medium 100 may be made as a discrete track medium with a magnetic recording part and a non-recording part formed in a linear shape and alternately disposed in a radius direction of a main surface, or a bit pattern medium dotted with magnetic recoding parts on the main surface.

Furthermore, in the ion implanting process, which will be described further below, the relative permeability of the non-recording part 134 can suitably be set at 2 to 100. Although the grain particles of the magnetic recording layer 122 are configured of CoCrPt in the present embodiment, they may be configured to contain one or plurality of elements selected from a group of Fe, Pt, Ru, Co, Cr, and Pd (for example, CoFeCrPt).

The auxiliary recording layer 124 is a magnetic recording layer magnetically approximately continuous in an in-plane direction of the main surface of the base. The auxiliary recording layer 124 is required to be adjacent to or near the magnetic recording layer 122 so as to have a magnetic interaction therewith. As a material of the auxiliary recording layer 124, for example, CoCrPt, CoCrPtB, or one of these with a subtle amount of an oxide contained therein be used for configuration. The auxiliary recording layer 124 adjusts an inverted-magnetic-domain nucleation magnetic field Hn and adjusts a coercive force Hc, thereby attaining an object of improving resistance to fluctuation, an overwrite characteristic, and an SNR. To achieve this object, the auxiliary recording layer 124 preferably has a high magnetic anisotropy Ku and a high saturated magnetization Ms. Note that although the auxiliary recording layer 124 is provided above the magnetic recording layer 122 in the present embodiment, it may be provided therebelow. Note that the present embodiment is configured to include the auxiliary recording layer 124 because a discrete type is exemplarily described as the magnetic recording medium 100. In the case of a bit pattern medium, no auxiliary recording layer may be included.

Note that "magnetically continuous" means that magnetism continues without interruption. "Approximately continuous" means that the auxiliary recording layer 124 may not be a single magnet when observed as a whole and may have magnetism partially discontinuous due to the grain boundary of the crystal particles. The grain boundary may have not only of a discontinuous crystal but also segregation of Cr. Furthermore, segregation may be performed with a subtle amount of an oxide contained therein. However, even when a grain boundary containing an oxide is formed in the auxiliary recording layer 124, the grain boundary preferably has an area (an oxide content) smaller than that of the grain boundary of the magnetic recording layer 122. Although the function and operation of the auxiliary recording layer 124 are not necessarily clear, it can be thought that, with magnetic interaction (exchange coupling) with the granular magnetic grains of the magnetic recording layer 122, Hn and Hc can be adjusted, thereby improving a characteristic of resistance to thermal fluctuation and SNR. It can also be thought that, since a crystal particle (crystal particles having magnetic interaction) connected to a granular magnetic grain has an area wider than a section of the granular magnetic grain, the particles receive more magnetic fluxes from the magnetic head to become prone to flux reversal, thereby improving an overwrite characteristic as a whole.

The protective layer 126 can be formed by forming a film of carbon (a C-type material) by CVD with a vacuum state kept. The protective layer 126 is a protective layer for protecting a perpendicular magnetic recording layer from an impact of the magnetic head. In general, since the carbon film formed by CVD has an improved film hardness compared with the one formed by sputtering, a perpendicular magnetic recording layer can be more effectively protected against an impact from the magnetic head.

Pattern Forming Process

Next, the pattern forming process is described in detail, in which a magnetic recording part 136 and a non-magnetic recording part 134 electrically separating the magnetic recording part 136 are formed in the magnetic recording layer 122 of the present embodiment. Here, the pattern forming process may be performed immediately after the magnetic recording layer film forming process described above, but may be performed after the auxiliary recording layer film forming process or the protective layer film forming process is performed.

In the present embodiment, the pattern forming process is performed after the protective layer film forming process is performed. With this, a film of the protective layer 126 is not require to be formed after the pattern forming process is performed, thereby simplifying the manufacturing process. Also, as will be described further below, when a resist layer is removed with an alkaline solution, the alkaline solution in which the resist layer is immersed does not directly make contact with the magnetic recording layer 122, thereby preventing impregnation of a portion as a magnetic recording part in the magnetic recording layer 122 with the alkaline solution and also preventing ions from being implanted in that portion. With this, an improvement in productivity and a reduction in contamination in the process of manufacturing the magnetic recording medium 100 can be achieved.

FIG. 2 is a descriptive diagram for describing the pattern forming process according to the present embodiment. Note that, in FIG. 2, for easy understanding, the layers on the base 110 side from the magnetic recording layer 122 are omitted. The pattern forming process is configured to include the resist layer film forming process, the patterning process, the ion implanting process, and the removing process. Each process in the pattern forming process is described below.

Resist Layer Film Forming Process

As depicted in FIG. 2(*a*), a film of a resist layer 130 is formed on the protective layer 126 by using spin coating. As the resist layer 130, SOG (Spin On Glass) having silica as a main component, a general UV-curable resin or novolac-type photoresist or the like can be suitably used.

Patterning Process

As depicted in FIG. 2(*b*), a stamper 132 is pressed onto the resist layer 130 to transfer a pattern (an imprint method). The stamper 132 has an asperity pattern corresponding to a magnetic recording part 136 as a recording region targeted for transfer and a non-recording part 134 for separating the magnetic recording part 136.

After the pattern is transferred by the stamper 132 onto the resist layer 130, the stamper 132 is removed from the resist layer 130, thereby forming the asperity pattern on the resist layer 130. Also, in the present embodiment, the surface of the stamper 132 is coated with a fluorine-type release agent. With this, the stamper 132 can be peeled off from the resist layer 130.

Ion Implanting Process

As depicted in FIG. 2(*c*), from a recessed part of the resist layer 130 patterned on a predetermined pattern in the patterning process, ions are implanted via the protective layer 126 to the magnetic recording layer by using an ion beam method. With this, a crystal of a part in the magnetic recording layer 122 where ions are implanted can be changed to be amorphous, thereby forming the non-recording part 134. A part below a projected part of the resist layer 130, that is, the magnetic recording part 136, can be magnetically separated.

In the present embodiment, by controlling a total amount of (dose amount) of ions to be implanted, the relative permeability of the non-recording part 134 of the magnetic recording layer 122 under the recessed part in the resist layer 130 is set at 2 to 100 (in FIG. 2, the non-recording part 134 is shown as being hatched). With a configuration at a relative permeability of the non-recording part 134, which magnetically separates the magnetic recording part 136, of 2 to 100, a write characteristic and a read characteristic with respect to the magnetic recording part 136 can be improved while an excellent SNR is being kept. The dose amount is preferably 1E15 to 1E17 atoms/cm$^2$, and can be, for example, 2E16 atoms/cm$^2$.

When the non-recording part 134 is configured with a relative permeability equal to or higher than 200 (which is referred to as soft, or soft magnetic), it is easy to write, but noise is large due to a large magnetic domain width. Therefore, the SNR is deteriorated, and therefore the read characteristic is decreased. When the non-recording part 134 is configured with a relative permeability equal to or lower than 2 to 100 (which is referred to as hard), it is difficult to write, and therefore the read characteristic is poor. By contrast, when the non-recording part 134 is set with a relative permeability equal to or lower than 2 (which is referred to as semi-hard), it is easy to write and noises are less, and therefore the read characteristic is in a good condition.

In the present embodiment, N can be suitably used as ions to be implanted. As another ions, ions of one or plurality of elements selected from a group of B, P, Si, F, C, In, Bi, Kr, Ar, Xe, W, As, Ge, Mo, Sn, N$_2$, and O$_2$ can be implanted.

Also, the energy amount for implanting ions is preferably 1 to 50 keV and, for example, it can be set as 20 keV. This is because, if the energy amount for implanting ions is equal to or smaller than 1 keV, magnetic separation of the magnetic recording part 136 in the magnetic recording layer 122 is not appropriately performed. Also, if the amount is equal to or larger than 50 keV, the magnetic recording layer 122 is changed to be too amorphous, thereby decreasing read/write characteristics and cause ions to be implanted into the magnetic recording part 136 under the projected part of the resist layer 130.

Here, regarding a portion corresponding to a surface of the pattern formed on the resist layer 130, when ion implantation is performed, a large amount of ions pass through that portion to alter that portion, thereby forming an altered resist layer 130*a*. And, an extremely thin residue is formed in the recessed part, thereby causing burning for strong adhesion to the protective layer 126.

Removing Process

As depicted in FIG. 2(*d*), the resist layer 130 is immersed in an alkaline solution 140. With this, as depicted in FIG. 2(*e*), the resist layer 130 can be easily removed without etching.

Also, in the present embodiment, a KOH solution having pH9 or higher is used as an alkaline solution. Since KOH is a strong base, the KOH solution has strong alkalescence. Note that the concentration of the KOH solution is preferably equal to or higher than 10% (approximately 2 mol/l). Furthermore, a time of immersion in the alkaline solution in the resist layer removing process is preferably on the order of five to sixty minutes. Note that the reaction temperature is preferably 40° C. to 80° C.

As for removal of the resist layer, the resist layer 130 may be removed by using a fluorine-type gas by ashing or RIE (Reactive Ion Etching). As etching gas, $SF_6$ can suitably used, but this is not meant to be restrictive, and any one or plurality of mixed gases selected from a group of $CF_4$, $CHF_3$, and $C_2F_6$ can also be suitable used. The type of etching gas can be selected as appropriate depending on the material of the resist layer 130. For example, when a novolac-type photoresist is used as the resist layer 130, oxygen gas is suitably used.

For a plasma source of RIE, ICP (Inductively Coupled Plasma) capable of generating high-density plasma at low pressure can be used. However, this is not meant to be restrictive, and ECR (electron Cyclotron Resonance) plasma or a general parallel-flat-type RIE apparatus can also be used.

As described above, since an alteration occurs in the surface layer part of the resist layer 130, the recessed part of the thin resist layer 130 is adhered to the protective layer 126. Therefore, in removing the resist layer 130, the whole is not removed, and the resist layer (resist agent) on the non-recording part 134 tends to be left on the surface of the protective layer as a residue. The thick projected part of the resist layer 130 has its surface layer altered, but portions other than the surface layer can be kept in a state (property) when a film of the resist layer 130 is formed, and therefore the resist agent on the magnetic recording part 136 can be removed without trouble. From this, when the resist layer 130 is being removed, the projected part first disappears, and then the removing process continues to make the recessed part disappear. Thus, in the present embodiment, the removing process ends before the recessed part disappears. That is, the resist layer is removed so that the resist agent on the non-recording part 134 is left more than the resist agent on the magnetic recording part 136. Here, the resist agent on the magnetic recording part 136 is not necessarily required to be completely removed, but a desired difference in height may suffice with a larger amount being left on the non-recording part 134.

Lubricating Layer Film Forming Process

The film of the lubricating layer 128 can be formed with perfluoropolyether (PFPE) by dip coating. PFPE has a long chain molecular structure, and is bonded to N atoms on the surface of the protective layer 126 with high affinity. With this operation of the lubricating layer 128, even if the magnetic head makes contact with the surface of the magnetic recording medium 100, damage and loss of the protective layer 126 can be prevented.

And, as depicted in FIG. 2(e), after the resist layer 130 is removed, the residue of the resist layer 130 is present as an altered resist layer 130a on the non-recording part 134. With this reside, the surface of the medium after the film of the lubricating layer 128 is formed is also in a protuberating state by an amount corresponding to the thickness of that residue.

Figure 3:
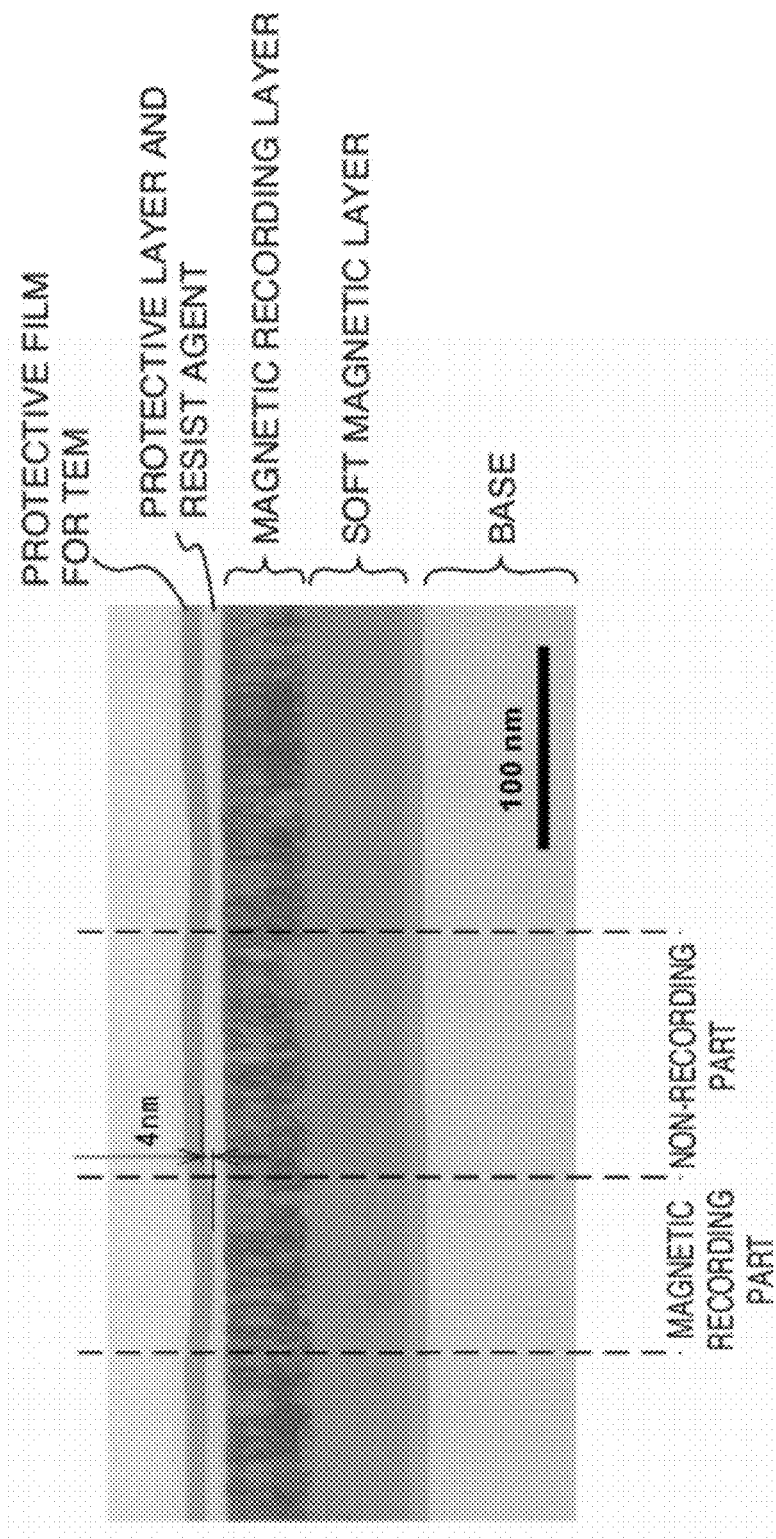
FIG. 3 A view of the magnetic recording medium according to an embodiment actually manufactured and observed with a TEM.

FIG. 3 is a view of the magnetic recording medium according to the present embodiment actually manufactured and observed with a TEM. In the drawing, the medium can be observed as being roughly divided into, from below, the base, the soft magnetic layer, the magnetic recording layer, and a protective layer. And an uppermost layer is a protective layer for a TEM, the film for protecting the disk when a TEM photographs is taken. And, with reference to the drawing, it can be found that the surface corresponding to the non-recording part protuberates more than the surface corresponding to the magnetic recording part. According to the magnification, the height of a protuberance (a difference between the non-recording part and the magnetic recording part) was on the order of 4 nm. And, the above-structured magnetic recording medium showed excellent result in a pin-on test or an impact resistance test, and therefore a magnetic recording medium excellent in HDI characteristics with high durability was able to be obtained. As the reason for this, it is thought that, even when the magnetic head is in contact, the magnetic head first makes contact with the upper portion of the non-magnetic part and the magnetic recording part is not damaged, and therefore the magnetic recording part escapes from damage.

As described above, according to the present embodiment, a magnetic recording medium can be provided in which, on the base, at least a surface corresponding to the non-recording part 134 protuberates more than the surface corresponding to the magnetic recording part 136.

And, for example, the surface of the non-recording part 134 can protuberate 1 to 4 nm more compared with the surface of the magnetic recording part 136. With this, even when the magnetic head makes contact with the magnetic recording medium 100, the magnetic head first makes contact with the upper portion of the non-recording part 134. Therefore, the magnetic recording part 136 can avoid the contact with its surface more than the non-recording part 134, thereby significantly improving HDI characteristics, such as impact resistance.

Examples

To ensure effectiveness of the above embodiment, description is made in comparison between examples and comparative examples below.

As an example, on the base 110, by using a vacuumed film forming device, films of the adhesion layer 112 to the auxiliary recording layer 124 were sequentially formed in an Ar atmosphere by DC magnetron sputtering. Note that an Ar gas pressure at the time of film formation by sputtering is 0.6 Pa unless otherwise specified. As for the adhesive layer 112, a film of Cr-50Ti of 10 nm was formed. As for the soft magnetic layer 114, films of the first soft magnetic layer 114a and the second soft magnetic layer 114c of 92(40Fe-60Co)-3Ta-5Zr of 20 nm each were formed so as to interpose the spacer layer 114b of 0.7 nm. As for the preliminary ground layer 116, a film of Ni-5W of 8 nm was formed. As for the ground layer 118, a film of Ru of 10 nm was formed at 0.6 Pa, and then a film of Ru of 10 nm was formed thereon at 5 Pa. As for the magnetic recording layer 122, a film of the first magnetic recording layer 122a of 90(70Co-10Cr-20Pt)-10($Cr_2O_3$) of 2 nm was formed at 3 Pa, and then a film of the second magnetic recording layer 122b of 90(72Co-10Cr-18Pt)-5($SiO_2$)-5 ($TiO_2$) of 12 nm was formed thereon at 3 Pa. As for the auxiliary recording layer 124, a film of 62Co-18Cr-15Pt-5B of 6 nm was formed. As for the protective layer 126, $C_2H_4$ was used to form a film of 4 nm by CVD.

Then, on the surface of the protective layer 126, a film of SOG having silica as a main component was formed as the resist layer 130. SOG changes a little in shape by ion irradiation and can maintain the fabricated pattern, and therefore is quite effective in maintaining pattern accuracy compared with an organic-type resist. Furthermore, by pressing the stamper 132 onto the resist layer 130 by an imprint method, a magnetic pattern was transferred. The stamper 132 has an asperity pattern corresponding to each of patterns of the magnetic recording part as a recording region for transfer and a servo region for storing servo information, such as a preamble part, an address part, and a burst part.

After the magnetic pattern was transferred by the stamper 132 onto the resist layer 130, the stamper 132 was removed from the resist layer 130, thereby transferring the asperity pattern to the resist layer 130.

Next, the resist layer 130 with the asperity pattern formed on the protective layer 126 was irradiated with ions, thereby implanting ions to the magnetic recording layer 122 (the ion implanting process). Specifically, when the resist layer 130 is irradiated with ions, ions permeate a portion corresponding to the recessed part of the resist layer 130. The ions then also permeate the protective layer to be implanted in the magnetic recording layer 122. On the other hand, as for a portion corresponding to the projected part, ions are prevented by the resist layer 130 from permeating. That is, the resist layer 130 works as a mask layer, and ions are not implanted in the magnetic recording layer 122 under the projected part. In this manner, a pattern in which ions are implanted in the magnetic recording layer 122 is determined correspondingly to the shape the asperity pattern.

Furthermore, ions were implanted in the pattern from a vertical direction, and ions were implanted from the recessed part of the resist layer 130 via the protective layer 126 into the magnetic recording layer 122 by an ion beam method. In the ion implanting process, as ions to be implanted, $N_2$ ions with an energy amount of approximately 0.5 to 50.0 keV and a dose amount of 1E14 to 1E18 [atoms/cm$^2$] were used for ion implantation.

Then, in the resist layer removing process, the resist layer 130 was removed through immersion in a KOH solution of pH9 as an alkaline solution at a reaction temperature of 60° C. for approximately 30 minutes. At this time, the time was adjusted so that a residue of 0.0 to 8.8 [nm] was left on the non-recording part. Then, after the surface layer of the protective layer 126 was subjected to a nitriding process, the lubricating layer 128 of 1 nm was formed by using PFPE by dip coating.

FIG. 4 is a diagram describing examples and comparative examples in the first embodiment. The examples and the comparative examples were compared with a method of peeling off the resist layer, a dose amount [atoms/cm$^2$] of ion implantation, and an energy amount [keV] variously changed. As a method of peeling off the resist layer, a wet process of immersion in a KOH solution or a dry process by ashing was performed. However, in the wet process, NaOH, ammonia, organic alkali, or the like can be used in place of the KOH solution. Also, as a dry process, RIE can be performed in place of ashing.

The height of the protuberance [nm] is a difference in height between the non-recording part and the magnetic recording part, and means herein a thickness of the residue of the resist layer. For evaluation, the presence or absence of magnetic separation was checked by a Magnetic Force Microscopy (MFM). To determine the presence or absence of magnetic separation, in addition to whether magnetic separation has adequately occurred, that is, whether the magnetic recording parts 136 were separated from each other, whether the non-recording part 134 has not spread too much (whether ions have been excessively implanted in the magnetic recording part 136) was used as a determination criterion. Next, as for the one in which separation had been confirmed, whether the head floats was checked in a read/write test was checked (a test for determining the presence or absence of head floating before an impact test). Furthermore, an impact resistance test was performed for the one in which the magnetic head floated in the test for determining the presence or absence of head floating before the impact test. In the impact resistance test, the medium as being incorporated in a hard disk was caused to fall freely from a height of 1 m. Thereafter, whether the head floated was checked in a read/write test (the test for determining the presence or absence of head floating before an impact test). As for each of these items, an OK/NG evaluation was performed, and those with NG at any stage were not used thereafter.

With reference to FIG. 4, in Examples 1-1 to 1-10, the height of the residue (the thickness of the residue) is within a range of 1 to 4 [nm], indicating adequate magnetic separation, and no crash occurred in the impact resistance test. In particular, in comparison between Example 1-5 to Comparative Example 1-13, it can be found that the results of the test for determining the presence or absence of head floating after the impact test are improved depending on a difference between the presence or absence of the thickness of the residue. From this, it has been confirmed that by setting the height of the residue (the thickness of the residue) at 1 to 4 [nm], an improvement in impact resistance can be achieved with adequate magnetic separation. As the reason for this, it is thought that, with the residue having a predetermined thickness being left on the non-recording part, the residue operates as a type of a protective film to reduce the possibility of collision between the magnetic head and the magnetic recording part 136. On the other hand, in Comparative Examples out of the range above, a crash (NG) occurred in the test for determining whether the presence or absence of head floating. In the case of a thickness smaller than 1 nm, it is thought that the residue does not have a protective film operation as described above and the magnetic recording part was damaged due to a collision with the magnetic head. Also, in the case of a thickness larger than 4 nm, it is thought that the difference in height was too large, thereby causing the floating of the head to be unstable Also, in comparison between Examples 1-9 and 1-10 and other examples, it has been confirmed that by setting the height of the protuberance at 1 to 4 [nm], an improvement in impact resistance can be similarly achieved even when the resist layer is removed by ashing. With this, it has been confirmed that, irrespectively of the method of removing the resist layer, by leaving a residue of a predetermined thickness in the non-recording part, the operation and effect of the present embodiment can be achieved.

With reference to Comparative Examples 1-1 to 1-9 and 1-12, magnetic separation was incomplete. This means that an ion distribution state determined by the energy and dose amount is not adequate. In detail, in Comparative Examples 1-1 to 1-6 and 1-8, the energy or dose amount was too small, thereby causing insufficient magnetic separation. In Comparative Examples 1-7, 1-9, and 1-12, the energy or dose amount was too large to cause the ions to permeate up to a region of the magnetic recording part 136 to decrease the magnetic recording part, thereby causing a signal to be weaker.

Next, in focusing on the ion implantation items, it can be found that the height of the protuberance is increased as the energy is increased or the dose amount is increased. This indicates that as the energy or dose amount is increased, a larger amount of resist agent is altered (burnt) and a residue tends to be left. As a matter of course, no matter how much amount the resist agent has been altered, if the removing process (immersion in an alkaline solution or ashing) is performed more, it is possible to remove the entire resist agent. However, it can be found that if the removing process of approximately a same degree is performed, a higher protuberance of residue tends to be formed as the energy is larger. In this view point, it has been confirmed in the present embodiment that a residue having a suitable height can be formed as long as at least a dose amount is within a range of 1E15 to 1E17 [atoms/cm$^2$] and energy is within a range of 5.0 to 50.0 [keV].

Second Embodiment

A magnetic recording medium and its manufacturing method according to the second embodiment of the present invention is described. FIG. 5 is a diagram for describing a process of manufacturing a magnetic recording medium according to the second embodiment. Portions overlapping those in the embodiment above are provided with the same reference characters and are not described herein.

In the embodiment above, description has been made such that, by leaving the residue of the resist agent on the non-recording part 134, a protuberance is formed on the non-recording part 134. By contrast, in the present embodiment, by increasing the amount of attachment of the lubricating layer 128 to the protective layer 126, the thickness of the lubricating layer 128 is varied to form a protuberance on the non-recording part 134.

Figure 5A:
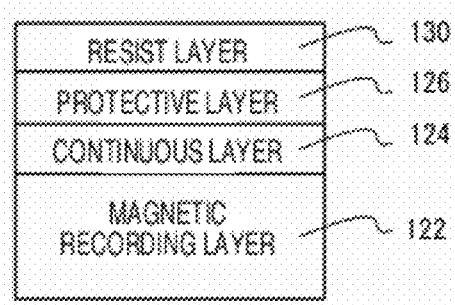
FIG. 5A-5E A descriptive diagram for describing a pattern forming process in a second embodiment.
Figure 5D:
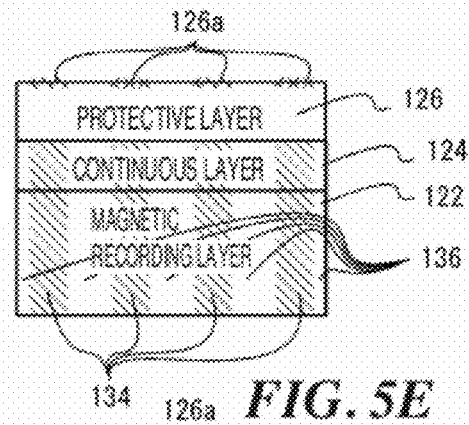
Figure 5B:
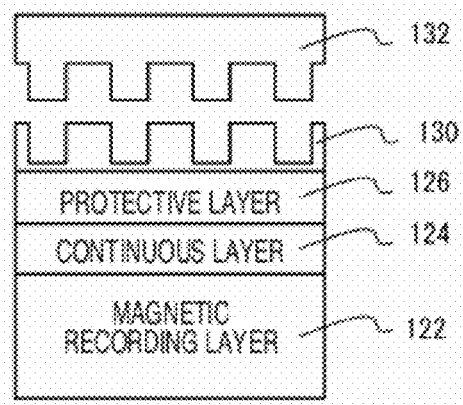
Figure 5E:
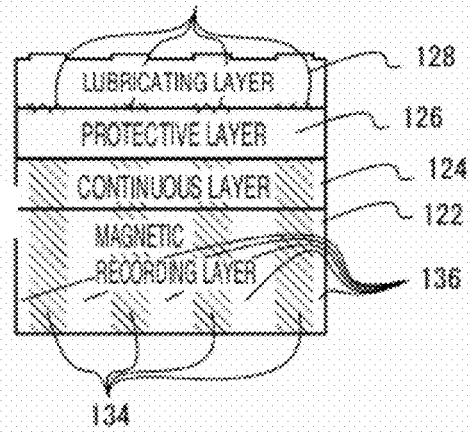
Figure 5C:
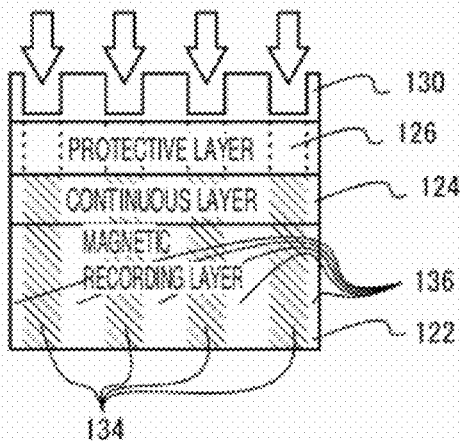

First, as depicted in FIG. 5(a), the auxiliary recording layer 124, the protective layer 126, and the resist layer 130 are sequentially formed on the magnetic recording layer 122. Next, as depicted in FIG. 5(b), the stamper 132 is used to form a predetermined asperity pattern on the resist layer 130. Then, as depicted in FIG. 5(c), ions are implanted from above the resist layer 130 on which the pattern is formed to form the non-recording part 134 and the magnetic recording part 136 in the magnetic recording layer 122. In the present embodiment, ion implantation is performed by using N ions.

Next, the resist layer is removed. In the second embodiment, as depicted in FIG. 5(d), the entire resist agent is removed. Note that whether a residue is left as in the first embodiment or the entire resist is removed as in the second embodiment can be adjusted depending on the time of immersion in the alkaline solution or the processing time of the resist layer removing process.

Here, the protective layer 126a on the non-recording part 134 contains implanted N ions more than those on the magnetic recording part 136. Therefore, on the non-recording part 134, PFPE molecules are bounded more, and the amount of attachment is more. Since a PFPE molecule is of a long chain, as the amount of attachment is increased, the volume of that region is significantly increased (the layer becomes thicker), causing a state as depicted in FIG. 5(e) in which the non-recording part 134 protuberates.

That is, by implanting N ions from above the resist layer 130, removing the resist layer 130, and forming a film of the lubricating layer 128 made of PFPE (perfluoropolyether) on the protective layer 126 (carbon protective layer), the magnetic recording medium 100 with the lubricating layer 128 above the no-recording part 134 protuberating can be manufactured.

Examples

To ensure effectiveness of the above embodiment, description is made in comparison between examples and comparative examples below.

In the present embodiment, in the ion implanting process, as ions to be implanted, $N_2$ ions having an energy amount of approximately 20.0 keV and a dose amount of 1E14 to 1E18 [atoms/cm$^2$] were used for ion implantation. In the resist layer removing process, the entire resist layer 130 was removed. The media were created with other points set similar to the examples of the first embodiment.

FIG. 6 is a diagram describing examples and comparative examples in the second embodiment. In FIG. 6, a difference [nm] in thickness of the lubricating layer is a difference in thickness of the lubricating layer 128 between the non-recording part 134 and the magnetic recording part 136, and the thickness of the lubricating layer in each medium is adjusted so that an average value is 1.2 nm. In Comparative Example 2-3, Ar is used as ions to be implanted and, since the amount of attachment of the lubricating layer is not increased, a difference in thickness of the lubricating layer is 0.

With reference to FIG. 6, in Examples 2-1 to 2-3, a difference in thickness of the lubricating layer 128 was 0.2 to 0.4 [nm], magnetic separation was adequately done, and no crash occurred in the impact resistance test. In particular, in comparison between Examples 2-2 and Comparative Example 2-3, it can be found that with a difference provided to the thickness of the lubricating layer 128, the results of the test for determining the presence or absence of head floating after the impact test are improved. From this, it has been confirmed that by setting the difference in thickness of the lubricating layer 128 at 0.2 to 0.4 [nm], an improvement in magnetic separation and impact resistance can be achieved with adequate magnetic separation. As the reason for the improvement in impact resistance, it is thought that, with the lubricating layer 128 on the non-recording part 134 protuberating, the head slides due to the thick lubricating layer 128 even when it is about to collide, thereby preventing a collision with the lubricating layer 128 on the magnetic recording part 136. Also in this case, the lubricating layer 128 above the magnetic recording part 136 is thin, a decrease in read/write characteristics is prevented.

Note that magnetic separation was incomplete in Comparative Examples 2-1 and 2-2. As the reason for this, it is thought that an ion distribution state was not adequate because the energy or dose amount was excessively small or excessive large. Also, in Comparative Examples 2-1 and 2-2, a test for determining the presence or absence of head floating before an impact test was also performed, and a crash (NG) occurred. As the reason for this, in Comparative Example 2-1, it is thought that the magnetic recording part was not able to be protected because the protuberance of the non-recording part was as small as 0.1 nm. Also, as the reason for this, in Comparative Example 2-2, it is thought that the floating of the head becomes unstable because the dose amount was excessively large to cause the lubricating agent to become to thick, thereby causing an interfering operation between the head and the disk.

Third Embodiment

A magnetic recording medium and its manufacturing method according to a third embodiment of the present invention are described. FIG. 7 is a diagram of a process of manufacturing a magnetic recording medium 100 according to the third embodiment. Portions overlapping those in the embodiment above are provided with the same reference characters and are not described herein.

Figure 7A:
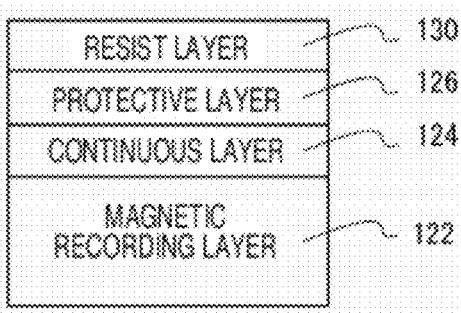
FIG. 7A-7F A descriptive diagram for describing a pattern forming process in a third embodiment.
Figure 7D:
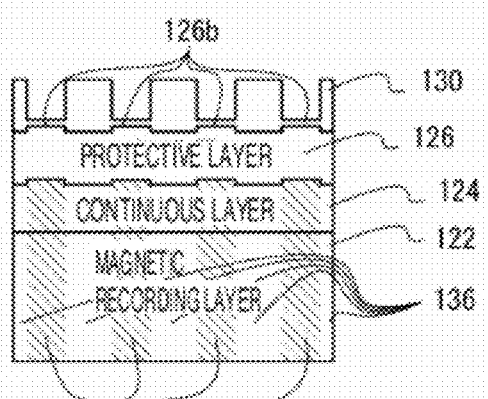
Figure 7B:
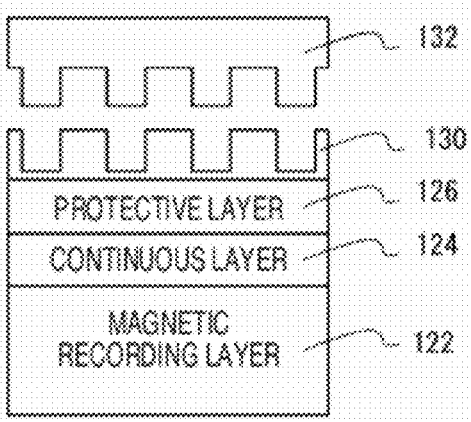
Figure 7E:
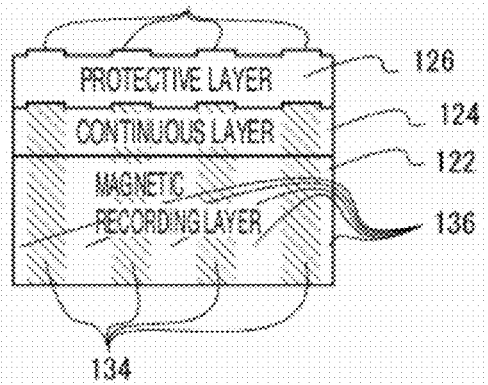
Figure 7C:
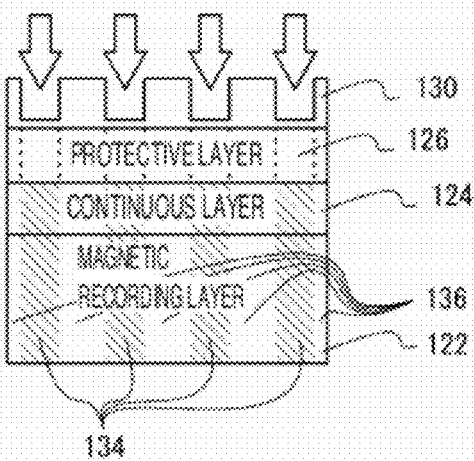
Figure 7F:
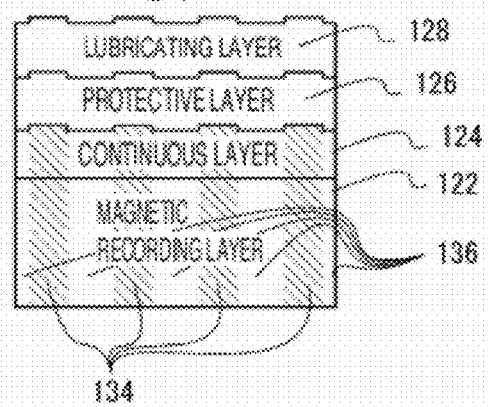

FIG. 7(a) to FIG. 7(c) are similar to those in the first embodiment. After the magnetic recording layer 122, the auxiliary recording layer 124, the protective layer 126, and the resist layer 130 are formed as depicted in FIG. 7(a), the stamper 132 is pressed onto the resist layer 130 as depicted in FIG. 7(b) to form a predetermined asperity pattern. Then, ions are implanted as depicted in FIG. 7(c) to form the non-recording part 134 and the magnetic recording part 136. At this time, ions are implanted so that the volume of the non-recording part 134 is expanded. As ions to be implanted, those having a large atomic weight are preferable, and Kr, Xe, or the like can be suitable used.

And, as depicted in FIG. 7(*d*), the non-recording part 134 protuberates and, accordingly, a part 126*b* is also formed on the protective layer 126 as being pushed out from the protuberating part of the non-recording part 134. And, the resist layer 130 is removed as depicted in FIG. 7(*d*), a film of the lubricating layer 128 is formed on the magnetic recording medium 100 with its surface protuberating as depicted in FIG. 7(*e*), thereby manufacturing a magnetic recording medium with its non-recording part 134 protuberating as depicted in FIG. 7(*f*).

Note that, to form a protuberance with the volume of the ions, ions intentionally far more than the dose amount for forming the non-recording part 134 may be dosed (implanted). Also, with ion implantation and the energy amount being adjusted, a target layer (a depth of implantation) may be not the magnetic recording layer 122 or the auxiliary recording layer 124 but the protective layer 126.

Examples

To ensure effectiveness of the above embodiments, description is made by using examples and comparison examples below.

In the present embodiment, in the ion implanting process, as ions to be implanted, Xe ions having an energy amount of approximately 20.0 keV and a dose amount of 1E14 to 1E18 [atoms/cm$^2$] were used for ion implantation. In the resist layer removing process, the entire resist layer 130 was removed. The media were created with other points set similar to the examples of the first embodiment.

With reference to FIG. 8, in Examples 3-1 to 3-3, the height of protuberance due to expansion was within a range of 1.1 to 2.1 [nm], and no crash occurred in the impact resistance test. From this, it has been confirmed that impact resistance can be improved also by expanding the non-recording part by ion implantation for protuberating. Note that with reference to the results of the examples of the first embodiment, it is thought that no crash occurs as long as the height of the protuberance is within a range of 1.0 to 4.0 [nm]. However, a height was difficult to obtain with protuberance by expansion, and the amount of implantation became excessively large when the height of the protuberance became 2.8 [nm].

Fourth Embodiment

FIG. 9 is a drawing for describing a pattern forming process according to a fourth embodiment. Note that, in FIG. 9, for easy understanding, layers on a base 110 side from the magnetic recording layer 122 are omitted.

The fourth embodiment is an example in which non-magnetization is promoted by removing the resist layer with immersion in an alkaline solution and further continuing immersion in the alkaline solution after the removal of the resist layer. The pattern forming process according to the fourth embodiment includes a resist layer film forming process, a patterning process, an ion implanting process, and a resist layer removing process. The pattern forming process is described in detail below.

Resist Layer Film Forming Process

As depicted in FIG. 9(*a*), a film of the resist layer 130 is formed on the magnetic recording layer 122 via the auxiliary recording layer 124 and the protective layer 126 by using spin coating. As the resist layer 130, SOG (Spin On Glass) having silica as a main component, a general novolac-type photoresist, or the like can be suitably used.

Patterning Process

As depicted in FIG. 9(*b*), the stamper 132 is pressed onto the resist layer 130 to transfer a magnetic pattern (an imprint method). With this, the resist layer 130 is processed, and the thickness of the resist layer 130 is partially changed. The stamper 132 has an asperity pattern corresponding to a predetermined pattern having a magnetic recording part and a non-recording part targeted for transfer. Note that the stamper can be provided not only with the predetermined pattern having a magnetic recording part and a non-recording part but also with an asperity pattern corresponding to a servo pattern for storing servo information, such as a preamble, an address, and a burst.

After the magnetic pattern is transferred by the stamper 132 onto the resist layer 130, the stamper 132 is removed from the resist layer 130, thereby transferring the asperity pattern formed of a projected part and a recessed part of the pattern (magnetic pattern) to the resist layer 130. In the present embodiment, the surface of the stamper 132 is coated with a fluorine-type releasing agent. With this, the stamper 132 can be excellently peeled off from the resist layer 130.

Note that although the imprint method is used by using the stamper 132 in patterning in the present embodiment, photolithography can also be suitably used. However, when photolithography is used, in formation of the film of the resist layer 130 described above, a film of a photoresist is formed as the resist layer 130, and the formed photoresist is exposed to light and developed by using a mask, thereby transferring a predetermined pattern as a magnetic recording part.

Ion Implanting Process

As depicted in FIG. 9(*c*), with the resist layer 130 having the predetermined pattern formed thereon by patterning being interposed, ions are implanted from the recessed part of the resist layer 130 to the magnetic recording layer 122 formed of the first magnetic recording layer 122*a* and the second magnetic recording layer 122*b* by using an ion beam method. With this, the crystal of a portion where ions are implanted in the magnetic recording layer 122 is changed to be amorphous, thereby non-magnetizing the first magnetic recording layer 122*a* and the second magnetic recording layer 122*b* to make the non-recording part 134 (depicted as hatched in FIG. 9). Therefore, a portion of the magnetic recording layer 122 under the projected part of the resist layer 130 can be made as a magnetically-separated magnetic recording part.

Note that, in the present embodiment, as ions to be implanted, one or plurality of Ar, $N_2$, and $O_2$ are used. However, these ions are not meant to be restrictive, and one or plurality of types of ions selected from a group of B, P, Si, F, C, In, Bi, Kr, Ar, Xe, W, As, Ge, Mo, Sn, $N_2$, and $O_2$ can be implanted.

Also, the energy amount for implanting ions is 1 to 50 keV. If the energy amount for implanting ions is equal to or smaller than 1 keV, magnetic separation of the magnetic recording part in the magnetic recording layer 122 is not appropriately performed, thereby causing noises to occur in reading by the head. As a result, the perpendicular magnetic recording medium 100 cannot be configured as a patterned medium. Also, if the amount is equal to or larger than 50 keV, the magnetic recording layer 122 is changed to be too non-magnetic and amorphous, thereby decreasing read/write characteristics and causing a portion of the magnetic recording layer 122 as the magnetic recording part under the projected part of the resist layer 130 to be also non-magnetized.

Furthermore, a total amount (a dose amount) of ions to be implanted is 1E15 to 1E17 atoms/cm$^2$. With this, the read/ write characteristics of the magnetic recording part can be improved while an excellent SNR is maintained.

Resist Layer Removing Process

As depicted in FIG. 9(d), by immersing the resist layer 130 in the alkaline solution 140, the resist layer 130 can be easily removed without etching as depicted in FIG. 9(e).

And, in the present embodiment, as in FIG. 9(e), even after the resist layer 130 is removed, the surface of the perpendicular magnetic recording medium 100 is continuously immersed in the alkaline solution. With this, non-magnetization of the non-recording part 134 is promoted. Therefore, even if the non-magnetization of the non-recording part 134 in the ion implanting process is insufficient, the non-recording part 134 can be reliably non-magnetized in the resist layer removing process. As the reason for this, it is thought that, when the magnetic recording layer 122 is impregnated with an alkaline solution, metal configuring magnetic particles of the magnetic recording layer 122 is dissolved into the alkaline solution, thereby causing the magnetic particles to become finer and become paramagnetic substances.

Also, in the present embodiment, as an alkaline solution, a KOH solution with pH9 or higher is used. Since KOH is a strong base, the KOH solution shows strong alkalescence. Therefore, the non-recording part 134 can be most effectively non-magnetized. Note that the concentration of the KOH solution is preferably equal or higher than 10 wt %. With this, the non-recording part 134 can be reliably non-magnetized.

Furthermore, the time of immersion in the alkaline solution in the resist layer removing process is preferably four hours or more. Note that the reaction temperature is preferably 40° C. to 80° C. With this, a portion in the magnetic recording layer 122 as the non-recording part 134 can be reliably impregnated with the alkaline solution.

FIG. 10 is a diagram showing a hysteresis loop with respect to processing time of the alkaline solution. As depicted in FIG. 10(a), according to the processing time for immersion in the alkaline solution (KOH), a transition is made from a loop shape A to a loop shape C. In the loop shape A, a loop having its center potion constricted can be observed. Then, as the immersion time elapses, it can be found that the loop is changed to the one in a normal shape. Here, since a MOKE (Magneto-Optical Kerr Effect) evaluation device has a laser spot diameter of approximately 600 µm, which is far larger than the pattern, magnetism information is observed with the recording part and the non-recording part of the magnetic recording layer 122 mixed therein. Therefore, as the reason why the loop shape A is a constricted loop, it is thought that the magnetism information about the hard-magnetic recording part and the magnetism information about the non-recording part 134 that has become soft magnetic by ion implantation are mixed.

And, the fact that the hysteresis loop becomes close to the normal hard magnetic one as the processing time elapses indicates that the magnetism of the non-recording part 134 is gradually lost to become non-magnetic.

Here, as depicted in FIG. 10(b), in Example 4-1, a 10 wt % KOH solution was used, and the reaction temperature was set at 40° C. In Example 4-2, a 20 wt % KOH solution was used, and the reaction temperature was set at 80° C. As a result, in Example 4-1, the processing times to the loop shapes B and C were two hours and four hours, respectively. In Example 4-2, those were 15 minutes and 30 minutes, respectively.

Note that the time of immersion in the alkaline solution in the resist layer removing process is suitably four hours in the present embodiment, but this is not meant to be restrictive. In detail, as in Example 4-1, when a 10 wt % KOH solution was used, the immersion time described above was suitable. However, when a KOH solution with a concentration further higher than 10 wt % or higher reaction temperature is used, it is obvious that the immersion time can be shortened. Even when a KOH solution with a concentration further higher than 10 wt % is used, if the immersion time is set to be equal to or longer than four hours, deterioration of the surface of the magnetic recording medium and an increase in surface coarseness are invited. Therefore, as a matter of course, the immersion time should be adjusted according to the concentration of the KOH solution. In actual use, in view of productivity, the concentration and reaction temperature of the KOH solution is preferably adjusted so that the immersion time is within 30 minutes. By way of example, values can be set as those in Example 4-2.

Note that the film of the protective layer 126 formed on the magnetic recording layer 122 (in the present embodiment, on the auxiliary recording layer 124) does not inhibit impregnation of the portion of the magnetic recording layer 122 as the non-recording part 134 with the alkaline solution. This is because, in the ion implanting process described above, ions are implanted in the magnetic recording layer 126 via the resist layer 130, the protective layer 126, and the auxiliary recording layer 124, and therefore the protective layer 126 in a coarse state due to the passage of the ions is gradually impregnated with the alkaline solution and then the alkaline solution eventually reaches the magnetic recording layer 122.

As described above, by performing the resist layer film forming process, the patterning process, the ion implanting process and the resist layer removing process, a predetermined pattern including the magnetic recording part and the non-recording part 134, that is, a magnetic pattern, is formed in an in-plane direction in the perpendicular magnetic recording medium 100. With this, the perpendicular magnetic recording medium 100 can be made as a patterned medium.

Lubricating Layer Film Forming Process

As depicted in FIG. 9(f), after the alkaline solution used in the resist layer removing process is removed, a film of the lubricating layer 128 is formed (on the protective film 126) in the perpendicular magnetic recording medium 100. The film of the lubricating layer 128 can be formed with PFPE (perfluoropolyether) by dip coating. PFPE has a long chain-shaped molecular structure, and is bonded to N atoms on the surface of the protective layer 126 with high affinity. With this operation of the lubricating layer 128, even if the magnetic head makes contact with the surface of the perpendicular magnetic recording medium 100, damage and loss of the protective layer 126 can be prevented.

As described above, according to the magnetic recording medium manufacturing method (the pattern forming process) according to the fourth embodiment, with the alkaline solution for use in removing the resist layer 130 in the resist layer removing process, not only removal of the resist layer 130 but also promotion of non-magnetization of the non-recording part 134 can be achieved. Therefore, since the non-recording part 134 can be reliably non-magnetized in the resist layer removing process, even if ion implantation is used in forming a magnetic pattern, a deterioration in read/write characteristics due to the magnetism of the non-recording part 134 can be prevented. Therefore, the quality of the perpendicular magnetic recording medium 100 can be improved. Also, by using ion implantation to form a magnetic pattern, a patterned medium can be manufactured more easily than the case of milling, thereby improving manufacturing efficiency of the magnetic recording medium.

Fifth Embodiment

A magnetic recording medium manufacturing method according to a fifth embodiment of the present invention is described. FIG. 11 is a drawing for describing a pattern forming process according to the fifth embodiment. Note that portions overlapping those in the fourth embodiment are provided with the same reference characters and are not described herein.

The pattern forming process according to the fifth embodiment includes a resist layer film forming process, a patterning process, an ion implanting process, a resist layer removing process, and a non-magnetization promoting process. In the resist layer removing process, in place of removal and planarization of the resist layer by using an alkaline solution, the resist layer is removed by RIE. Therefore, the structure of each layer of a perpendicular magnetic recording medium as the magnetic recording medium according to the fifth embodiment is substantially identical to that of the perpendicular magnetic recording medium 100 according to the fourth embodiment, and the pattern forming process according to the fifth embodiment is identical to that of the fourth embodiment up to the ion implanting process. Therefore, the component already described in the fourth embodiment are not described herein, and only differences from the fourth embodiment, that is, the resist layer removing process and the non-magnetization promoting process, are described in detail.

Resist Layer Removing Process)

A film of the resist layer 130 is formed as depicted in FIG. 11(*a*), a pattern is transferred as depicted in FIG. 11(*b*), and then the ion implanting process is performed as depicted in FIG. 11(*c*). Then, as depicted in FIG. 11(*d*), the resist layer 130 is removed by RIE (Reactive Ion Etching) using fluorine-type gas. With this, the perpendicular magnetic recording medium 100 becomes in a state depicted in FIG. 11(*e*). Although $SF_6$ is used as etching gas in the present embodiment, this is not meant to be restrictive, and any one or plurality of mixed gases selected from a group of $CF_4$, $CHF_3$, and $C_2F_6$ can also be suitable used.

Note that although etching is performed by using fluorine-type gas because SOG is used as the resist layer 130 in the present embodiment, it goes without saying that the type of gas may be changed as appropriate depending on the material of the resist layer 130. For example, a novolac-type photoresist is used as the resist layer 130, RIE using oxygen gas is suitable.

Also, for a plasma source of RIE in the present embodiment, ICP (Inductively Coupled Plasma) capable of generating high-density plasma at low pressure is used. However, this is not meant to be restrictive, and ECR (Electron Cyclotron Resonance) plasma or a general parallel-flat-type RIE apparatus can also be used.

Non-Magnetization Promoting Process

After the resist layer 130 is removed by RIE, as depicted in FIG. 11(*f*), the surface of the perpendicular magnetic recording medium 100 is immersed in an alkaline solution. With this, non-magnetization of the non-recording part 134 is promoted. Note that the type, concentration, and immersion time of the alkaline solution have been described in detail in the fourth embodiment, and therefore are not described in the present embodiment.

As described above, by performing the resist layer film forming process, the patterning process, the ion implanting process, the resist layer removing process, and the non-magunetization promoting process, a predetermined pattern including the magnetic recording part and the non-recording part 134, that is, a magnetic pattern, is formed in an in-plane direction in the perpendicular magnetic recording medium 100. With this, the perpendicular magnetic recording medium 100 can be made as a patterned medium.

As described above, also in the magnetic recording medium manufacturing method (the pattern forming process) according to the fifth embodiment, by using the alkaline solution in the non-magnetization promoting process, non-magnetization of the non-recording part 134 can be promoted, and advantages similar to those of the fourth embodiment described above can be obtained. And, in the fifth embodiment, the resist layer 130 is removed in advance by RIE before immersion in the alkaline solution, thereby allowing a reduction in immersion time, a reduction in manufacturing time of the magnetic recording medium, and in turn an improvement in manufacturing efficiency.

In the foregoing, while the preferred embodiments of the present invention have been described with reference to the attached drawings, it goes without saying that the present invention is not restricted to these examples. It is clear that various types of modification examples and corrected examples can be conceived by a person skilled in the art in a category described in the scope of claims for patent, and it is understood that these also belong to the technical range of the present invention.

For example, although the magnetic recording layer 122 is configured with two layers having a granular structure in the embodiments above, this is not meant to be restrictive, and may be configured with one layer or a plurality of layers and also may not have a granular structure. Also, although the magnetic recording medium according to the present invention has been described as the perpendicular magnetic recording medium 100, this is not meant to be restrictive. The present invention can be suitably used in an in-plane magnetic recording medium.

INDUSTRIAL AVAILABILITY

The present invention can be used for a magnetic recording medium and a magnetic recording medium manufacturing methods.

The invention claimed is:

1. A method of manufacturing a magnetic recording medium including, a base having thereon at least a magnetic recording layer having a magnetic recording part and a non-recording part in an in-plane direction, wherein a surface of the magnetic recording medium being above the non-recording part protuberates more than a surface of the magnetic recording medium being above the magnetic recording part, the method comprising:
   a magnetic recording layer forming step of forming at least one magnetic recording layer over the base;
   a protective layer forming step of forming a film of a protective layer made of a C-based material on the magnetic recording layer by CVD;
   a resist layer forming step of forming a film of a resist layer on the protective layer;
   a patterning step of processing the resist layer to partially change a thickness of the resist layer and form a projected part and a recessed part of a predetermined pattern;
   an ion implanting step of implanting ions into the magnetic recording layer through the resist layer, wherein when the ions are implanted through the recessed part of the resist layer, a surface portion of the resist layer is altered and adhered to the protective layer as a residue;
   a resist layer removing step of removing the resist layer by reactive ion etching, wherein the residue is left on the protective layer after the resist layer removing step, and the residue on the protective layer being above the magnetic recording part is less than the residue on the protective layer being above the non-recording part; and a non-magnetization promoting step of promoting non-magnetization of the non-recording part by immersion in an alkaline solution after the resist layer is removed.

2. The method of manufacturing the magnetic recording medium according to claim 1 wherein the alkaline solution is a KOH solution with pH9 or higher.

3. The method of manufacturing the magnetic recording medium according to claim 2, wherein the KOH solution has a concentration of KOH equal to or higher than 10 wt %.

4. The method of manufacturing the magnetic recording medium according to claim 1, wherein a difference in height between the residue above the non-recording part and the magnetic recording part is within a range of 1 to 4 nm.

5. The method of manufacturing the magnetic recording medium according to claim 1, further comprising a lubricating layer forming step of forming a film of a lubricating layer made of perfluoropolyether on the protective layer with the residue subsequent to the non-magnetization promoting step, wherein the implanting ions are N ions.

* * * * *